United States Patent
Tsuchizawa et al.

(10) Patent No.: US 9,840,305 B1
(45) Date of Patent: Dec. 12, 2017

(54) BICYCLE CONTROL DEVICE AND BICYCLE CONTROL SYSTEM

(71) Applicant: SHIMANO INC., Sakai (JP)

(72) Inventors: Yasuhiro Tsuchizawa, Sakai (JP); Hiroshi Matsuda, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/168,217

(22) Filed: May 30, 2016

(51) Int. Cl.
*B62M 6/80* (2010.01)
*B62M 6/00* (2010.01)
*B62J 1/08* (2006.01)

(52) U.S. Cl.
CPC .................. *B62M 6/80* (2013.01); *B62J 1/08* (2013.01); *B62M 6/00* (2013.01); *B62J 2001/085* (2013.01)

(58) Field of Classification Search
CPC ..... B62M 6/00; B62M 6/80; B62J 1/08; B62J 2001/085
See application file for complete search history.

(56) References Cited

U.S. PATENT DOCUMENTS

| 6,246,548 B1* | 6/2001 | Williams | G11B 5/4846 29/840 |
| 6,247,548 B1* | 6/2001 | Hayashi | B60L 11/1801 180/206.2 |
| 2002/0185581 A1* | 12/2002 | Trask | B62J 1/08 248/408 |

FOREIGN PATENT DOCUMENTS

| JP | 3974974 B2 | 2/1999 |
| JP | 2011-207373 | 10/2011 |
| JP | 2011201373 A | * 10/2011 |
| JP | 2012-148580 | 8/2012 |

* cited by examiner

*Primary Examiner* — Aaron L Troost
(74) *Attorney, Agent, or Firm* — Mori & Ward, LLP

(57) ABSTRACT

A bicycle control device comprises a seat information generator and an assist controller. The seat information generator is configured to generate seat information. The assist controller is configured to control an assist actuator to assist a driving force of a bicycle based on the seat information.

21 Claims, 15 Drawing Sheets

| STATE TRANSITION | GRADIENT OF THE ROAD | SEAT HEIGHT POSITION | SEAT HORIZONTAL POSITION | SEAT ANGLE POSITION | ASSIST RATIO |
|---|---|---|---|---|---|
| I | LEVEL ROAD | - | - | - | - |
| II | LEVEL ROAD → UPHILL | RAISED | FORWARD | FORWARD TILTING | INCREASE |
| III | UPHILL | - | - | - | - |
| IV | UPHILL → LEVEL ROAD | LOWERED | BACKWARD | BACKWARD TILTING | DECREASE |
| V | LEVEL ROAD → DOWNHILL | LOWERED | BACKWARD | BACKWARD TILTING | DECREASE |
| VI | DOWNHILL | - | - | - | - |
| VII | DOWNHILL → LEVEL ROAD | RAISED | FORWARD | FORWARD TILTING | INCREASE |
| VIII | DOWNHILL → UPHILL | RAISED | FORWARD | FORWARD TILTING | INCREASE |
| IX | UPHILL → DOWNHILL | LOWERED | BACKWARD | BACKWARD TILTING | DECREASE |

FIG. 9

| STATE TRANSITION | GRADIENT OF THE ROAD | SEAT HEIGHT POSITION | SEAT HORIZONTAL POSITION | SEAT ANGLE POSITION | ASSIST RATIO |
|---|---|---|---|---|---|
| I | LEVEL ROAD | - | - | - | - |
| II | LEVEL ROAD → UPHILL | RAISED | FORWARD | FORWARD TILTING | INCREASE → DECREASE |
| III | UPHILL | - | - | - | - |
| IV | UPHILL → LEVEL ROAD | LOWERED | BACKWARD | BACKWARD TILTING | DECREASE → INCREASE |
| V | LEVEL ROAD → DOWNHILL | LOWERED | BACKWARD | BACKWARD TILTING | DECREASE → INCREASE |
| VI | DOWNHILL | - | - | - | - |
| VII | DOWNHILL → LEVEL ROAD | RAISED | FORWARD | FORWARD TILTING | INCREASE → DECREASE |
| VIII | DOWNHILL → UPHILL | RAISED | FORWARD | FORWARD TILTING | INCREASE → DECREASE |
| IX | UPHILL → DOWNHILL | LOWERED | BACKWARD | BACKWARD TILTING | DECREASE → INCREASE |

FIG. 11

BICYCLE CONTROL DEVICE AND BICYCLE CONTROL SYSTEM

BACKGROUND OF THE INVENTION

Field of the Invention

The present invention relates to a bicycle control device and a bicycle control system.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle control device in a bicycle control system.

SUMMARY OF THE INVENTION

In accordance with a first aspect of the present invention, a bicycle control device comprises a seat information generator and an assist controller. The seat information generator is configured to generate seat information. The assist controller is configured to control an assist actuator to assist a driving force of a bicycle based on the seat information.

With the bicycle control device according to the first aspect, it is possible to change the driving force based on the seat information. The seat information is related to a rider's posture on the bicycle and a rider's pedaling load to move the bicycle forward. Accordingly, it can alleviate a load of a rider's foot or increase operability of the bicycle.

In accordance with a second aspect of the present invention, the bicycle control device according to the first aspect further comprises a driving force detector. The driving force detector is configured to detect the driving force. The assist controller is configured to control the assist actuator to generate an assisting force based on the driving force and to change an assist ratio of the assisting force to the driving force based on the seat information.

With the bicycle control device according to the second aspect, it is possible to change the assist ratio based on the seat information. The seat information is related to a rider's posture on the bicycle and a rider's pedaling load to move the bicycle forward. Accordingly, it can alleviate a load of a rider's foot or increase operability of the bicycle.

In accordance with a third aspect of the present invention, the bicycle control device according to one of the above aspects is configured so that the seat information generator includes a seat position detector to detect a seat position corresponding to at least one of seat height position, seat angle position, and seat horizontal position. The seat information includes the seat position.

With the bicycle control device according to the third aspect, it is possible to change the assist ratio based on at least one of seat height position, seat angle position, and seat horizontal position. When a rider goes up a hill with the bicycle, a rider usually desires to raise the seat, move the seat forward, tilt the seat forward and downward to facilitate an increase of the pedaling force. When a rider goes down a hill with the bicycle, a rider usually desires to lower the seat, move the seat backward, tilt the seat backward and downward to increase operability of the bicycle. Accordingly, it can alleviate a load of a rider's foot or increase operability of the bicycle.

In accordance with a fourth aspect of the present invention, the bicycle control device according to one of the above aspects is configured so that the seat height position corresponds to a variable overall length of an adjustable seatpost. The assist controller increases the assist ratio when the variable overall length increases.

With the bicycle control device according to the fourth aspect, it is possible to increase the assist ratio when the seat is raised. Accordingly, it can alleviate a load of a rider's foot.

In accordance with a fifth aspect of the present invention, the bicycle control device according to one of the above aspects is configured so that the seat height position corresponds to a variable overall length of an adjustable seatpost. The assist controller decreases the assist ratio when the variable overall length decreases.

With the bicycle control device according to the fifth aspect, it is possible to decrease the assist ratio when the seat is lowered. Accordingly, it can increase operability of the bicycle.

In accordance with a sixth aspect of the present invention, the bicycle control device according to the fourth aspect is configured so that the assist controller decreases the assist ratio when the variable overall length decreases.

With the bicycle control device according to the sixth aspect, it is possible to increase the assist ratio when the seat is raised. Accordingly, it can alleviate a load of a rider's foot. In addition, it is possible to decrease the assist ratio when the seat is lowered. Accordingly, it can increase operability of the bicycle.

In accordance with a seventh aspect of the present invention, the bicycle control device according to one of the above aspects is configured so that the seat information generator includes a seat operation device configured to receive a seat adjustment operation input by a rider. The seat operation device is configured to generate a seat adjustment trigger in accordance with the seat adjustment operation to transmit the seat adjustment trigger to a seat controller. The seat information includes the seat adjustment trigger.

With the bicycle control device according to the seventh aspect, it is possible to change the assist ratio based on the seat adjustment trigger. Accordingly, a performance of the bicycle control device can be enhanced.

In accordance with an eighth aspect of the present invention, the bicycle control device according to one of the above aspects is configured so that the seat operation device transmits the seat adjustment trigger to the seat controller via wireless communication.

With the bicycle control device according to the eighth aspect, it is possible for the bicycle control device to transmit the seat adjustment trigger to the seat controller via wireless communication. Thus, a communication cable between the bicycle control device and the seat controller can be omitted. Accordingly, it enhances a design flexibility of the bicycle.

In accordance with a ninth aspect of the present invention, the bicycle control device according to one of the above aspects further comprises a seat controller configured to control a seat actuator to change the seat position based on the seat adjustment trigger.

With the bicycle control device according to the ninth aspect, it is possible for a rider to operate the seat controller to change the seat position. Accordingly, the rider can easily change the seat position while the rider pedals the bicycle.

In accordance with a tenth aspect of the present invention, the bicycle control device according to one of the above aspects is configured so that the seat actuator changes the seat position while the seat adjustment operation is input.

With the bicycle control device according to the tenth aspect, a rider can continuously change the seat position by adjusting a time length to input the seat adjustment operation. Accordingly, the rider can change the seat position flexibly.

In accordance with an eleventh aspect of the present invention, the bicycle control device according to one of the above aspects further comprises a bicycle tilt sensor and a seat controller. The bicycle tilt sensor is configured to detect a tilt angle of a slope on which a bicycle is. The seat controller is configured to control a seat actuator to change the seat position based on the tilt angle.

With the bicycle control device according to the eleventh aspect, it is possible to change the seat position based on the tilt angle of the slope on which the bicycle is. When a rider goes up a hill with the bicycle, a rider usually desires to change the seat position to facilitate an increase of the pedaling force. When a rider goes down a hill with the bicycle, a rider usually desires to change the seat position differently to increase operability of the bicycle. Accordingly, it is possible to change the seat position automatically in accordance with a rider's usual desire to increase convenience of the bicycle.

In accordance with a twelfth aspect of the present invention, the bicycle control device according to one of the above aspects is configured so that the seat height position corresponds to a variable overall length of an adjustable seatpost. The seat controller increases the variable overall length to be a first length when the slope is uphill and decreases the variable overall length to be a second length when the slope is downhill.

With the bicycle control device according to the twelfth aspect, it is possible to change the overall length of the adjustable seatpost based on the tilt angle of the slope on which the bicycle is. When a rider goes up a hill with the bicycle, a rider usually desires to raise the seat to facilitate an increase of the pedaling force. When a rider goes down a hill with the bicycle, a rider usually desires to lower the seat to increase operability of the bicycle. Accordingly, it is possible to change the overall length of the adjustable seatpost automatically in accordance with a rider's usual desire to increase convenience of the bicycle.

In accordance with a thirteenth aspect of the present invention, the bicycle control device according to one of the above aspects further comprises a driving force detector configured to detect the driving force. The assist controller is configured to control the assist actuator to generate an assisting force based on the driving force and to change an assist ratio of the assisting force to the driving force based on the seat information. The assist controller temporarily increases the assist ratio to be a first assist ratio when the slope is uphill until the variable overall length of the seatpost reaches the first length. The assist controller temporarily decreases the assist ratio to be a second assist ratio when the slope is downhill until the variable overall length of the seatpost reaches the second length.

With the bicycle control device according to the thirteenth aspect, it takes time for the seatpost to have a target length (the first length or the second length) based on the tilt angle of the slope, but it is possible to immediate change the assist ratio based on the tilt angle of the slope until the seatpost has the target length to increase pedaling convenience of the bicycle.

In accordance with a fourteenth aspect of the present invention, the bicycle control device according to one of the above aspects is configured so that the assist controller decreases the assist ratio to be a third assist ratio smaller than the first assist ratio after the overall length of the seatpost reaches the first length. The assist controller increases the assist ratio to be a fourth assist ratio larger than the second assist ratio after the overall length of the seatpost has the second length.

With the bicycle control device according to the fourteenth aspect, it is possible to immediate return the assist ratio toward an original value after the seatpost has the target length. Therefore, pedaling convenience of the bicycle is further increased.

In accordance with a fifteenth aspect of the present invention, the bicycle control device according to one of the above aspects further comprises the seat controller configured to control the seat actuator to change a variable overall length of an adjustable seatpost based on the seat adjustment trigger. The seat height position corresponds to the variable overall length.

With the bicycle control device according to the fifteenth aspect, it is possible for a rider to operate the seat controller to change the seat height position. Accordingly, the rider can easily change the seat height position while the rider pedals the bicycle.

In accordance with a sixteenth aspect of the present invention, the bicycle control device according to one of the above aspects is configured so that the seat adjustment operation includes inputting a seat setting value related to the variable overall length. The seat adjustment trigger includes information related to the seat setting value. The seat actuator changes the variable overall length in accordance with the seat setting value.

With the bicycle control device according to the sixteenth aspect, it is possible to change the seat height position, for example, by shifting the switch or the lever. Therefore, the rider can operate the seat operation device in a short time to change the seat height position.

In accordance with a seventeenth aspect of the present invention, the bicycle control device according to one of the above aspects is configured so that the assist controller increases the assist ratio when the seat setting value indicates the variable overall length is increased. The assist controller decreases the assist ratio when the seat setting value indicates the variable overall length is decreased.

With the bicycle control device according to the seventeenth aspect, it is possible to increase the assist ratio when the seat is to be raised. Accordingly, it can alleviate a load of a rider's foot. In addition, it is possible to decrease the assist ratio when the seat is to be lowered. Accordingly, it can increase operability of the bicycle.

In accordance with an eighteenth aspect of the present invention, the bicycle control device according to one of the above aspects further comprises a speed sensor configured to detect a speed of the bicycle. The seat information generator includes a seating sensor to detect a seat load applied to a seat or a seatpost. The seat information includes the seat load. The assist controller increases the assist ratio when the bicycle speed detected by the speed sensor is over a predetermined speed and the seat load detected by the seating sensor is under a predetermined level.

With the bicycle control device according to the eighteenth aspect, it is possible to increase the assist ratio when a rider pedals the bicycle without sitting on the seat, for example, when the rider goes up a hill with the bicycle. Accordingly, it can alleviate a load of a rider's foot.

In accordance with a nineteenth aspect of the present invention, the bicycle control device according to one of the above aspects further comprises a pedaling detector configured to detect a pedaling of a rider. The seat information generator includes a seating sensor to detect a seat load applied to a seat or a seatpost. The seat information includes the seat load. The assist controller increases the assist ratio when the pedaling detector detects the pedaling of the rider and the seat load detected by the seating sensor is under a predetermined level.

With the bicycle control device according to the nineteenth aspect, it is possible to increase the assist ratio when a rider pedals the bicycle without sitting on the seat, for example, when the rider goes up a hill with the bicycle. Accordingly, it can alleviate a load of a rider's foot.

In accordance with a twentieth aspect of the present invention, the bicycle control system comprises the above bicycle control device, an adjustable seatpost having a variable overall length, and the assist actuator.

With the bicycle control system according to the twentieth aspect, it is possible to change the driving force based on the variable overall length of the adjustable seatpost. The variable overall length is related to a rider's posture on the bicycle and a rider's pedaling load to move the bicycle forward. Accordingly, it can alleviate a load of a rider's foot or increase operability of the bicycle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 9 shows a correspondence table including state transitions, corresponding gradients of the road, corresponding seat height position changes, corresponding seat horizontal position changes, corresponding seat angle position changes, and corresponding assist ratio changes in accordance with the second embodiment.

FIG. 11 shows a correspondence table including state transitions, corresponding gradients of the road, corresponding seat height position changes, corresponding seat horizontal position changes, corresponding seat angle position changes, and corresponding assist ratio changes in accordance with the third embodiment.

DESCRIPTION OF THE EMBODIMENTS

Figure 1:
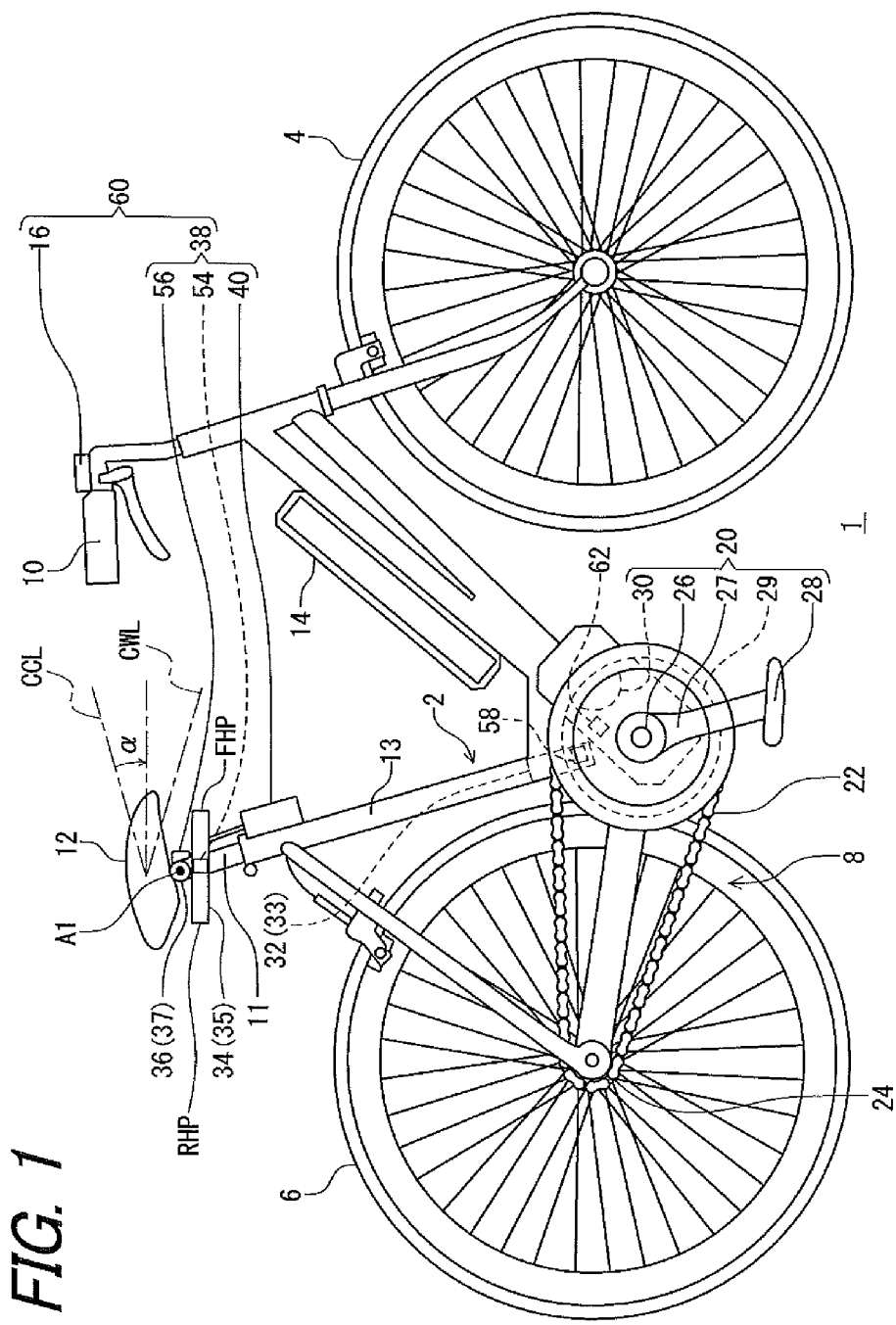
FIG. 1 is a schematic diagram of a motor assist bicycle.

The embodiments will now be described with reference to the accompanying drawings, wherein like reference numerals designate corresponding or identical elements throughout the various drawings.

First Embodiment

Figure 2:
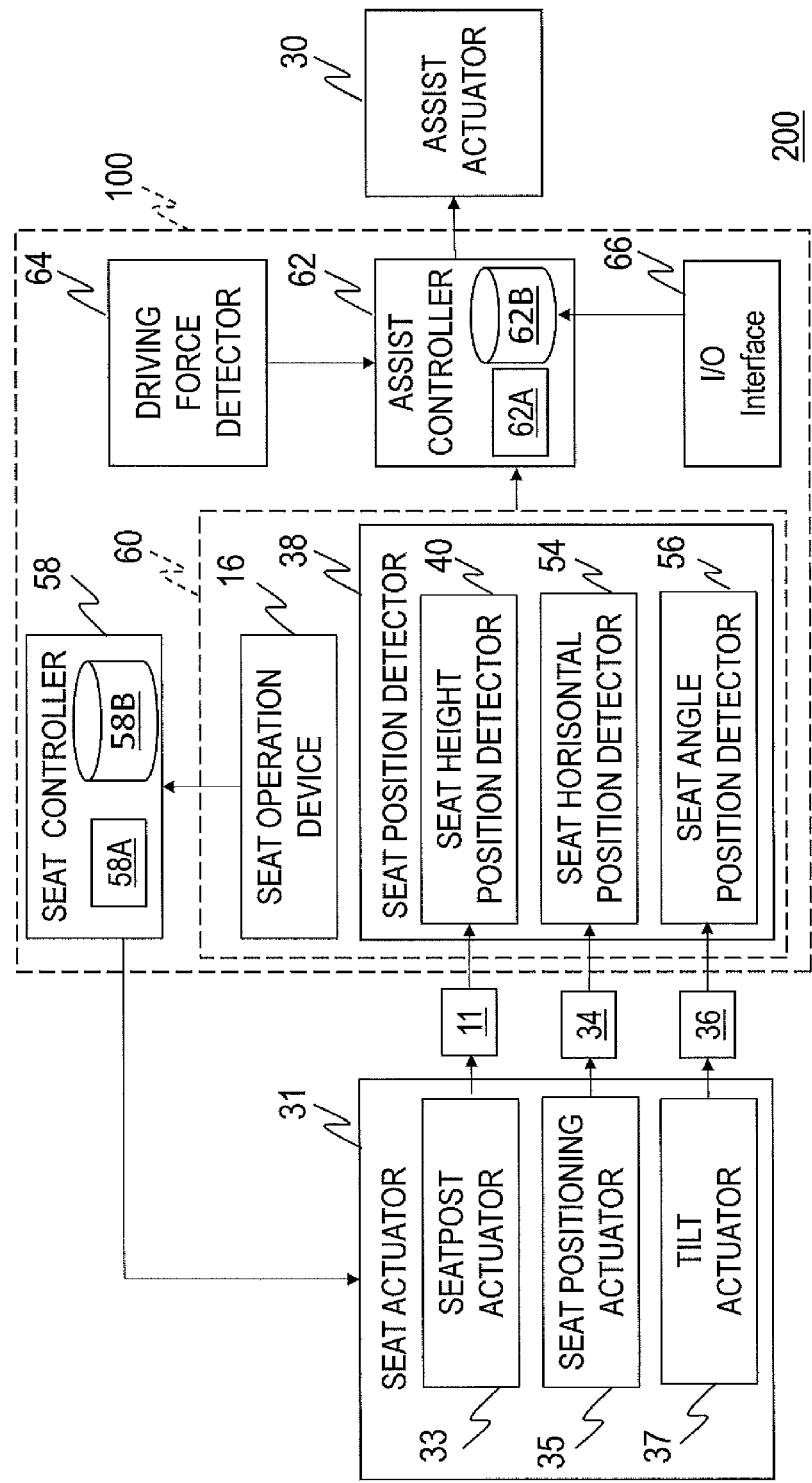
FIG. 2 is a block diagram of a bicycle control system in accordance with a first embodiment.

FIG. 1 shows one example of a motor assist bicycle 1 including a bicycle control system 200. FIG. 2 is a block diagram of a bicycle control system 200. In the present application, the motor assist bicycle 1 can be referred to as a bicycle 1. The bicycle 1 includes a frame 2, two rotatable wheels (a front wheel 4 and a rear wheel 6) coupled to the frame 2, a drive mechanism 8 to drive the rear wheel 6, a handle bar 10 to turn the front wheel 4, a seat 12, a battery 14, and a seat operation device 16.

In the present application, the following directional terms "front", "rear", "forward", "rearward", "left", "right", "transverse", "upward" and "downward" as well as any other similar directional terms refer to those directions which are determined on the basis of a rider who sits on the seat 12 of the bicycle 1 with facing the handle bar 10. Accordingly, these terms, as utilized to describe the seat operation device 16, should be interpreted relative to the bicycle 1 equipped with the seat operation device 16 as used in an upright riding position on a horizontal surface.

The drive mechanism 8 includes a drive unit 20, a chain 22, and a rear sprocket 24. The drive unit 20 includes a crankshaft 26, a crank arm 27, a pedal 28, a front sprocket 29, and an assist actuator 30. A rider applies a pedaling force (a driving force of the bicycle 1) to the pedal 28. The assist actuator 30 generates an assisting force to assist the driving force of the bicycle 1. FIG. 1 shows the assist actuator 30 as a midship motor to add the driving force to a transmission pass of the pedaling force between the crankshaft 26 and a chain 22, but the assist actuator 30 may be a front motor to add the driving force to an axle of the front wheel 4 or a rear motor to add the driving force to the hub of the rear wheel 6. The assist actuator 30 can add the driving force to at least one of the front sprocket 29, the chain 22 and the crankshaft 26. In the present embodiment, the assist actuator 30 is configured to add the driving force to the front sprocket 29.

The assisting force from the assist actuator 30 may be transmitted to the front sprocket 29 via a speed reducer. The pedaling force from the pedal 28 may be transmitted to the front sprocket 29 via the crank arm 27 and crank shaft 26. The speed reducer has a set of gears to reduce the speed of the rotation generated by an output shaft of the assist actuator 30 to transmit the rotation to the front sprocket 29. The assisting force and the pedaling force are merged into a resultant rotational force to be applied to the front sprocket 29.

The resultant rotational force can be transmitted to the front sprocket 29 via a one-way clutch. When the crankshaft 26 is rotated in the forward direction, the one-way clutch transmits the resultant rotational force to the front sprocket 29. When the crankshaft 26 is rotated in the rearward direction, the one-way clutch does not transmit the resultant rotational force to the front sprocket 29. Rotation of the crankshaft 26 in the forward direction is referred to as rotation of the crankshaft 26 in a direction to move the bicycle 1 forward. The one-way clutch does not necessarily have to be arranged between the crankshaft 26 and the front sprocket 29. The one-way clutch may be omitted in a case where a coaster brake is arranged in a hub of the rear wheel 6.

The front sprocket 29 transmits the resultant rotational force from the crankshaft 26 to the chain 22. The chain 22 transmits the resultant rotational force from the front sprocket 29 to the rear sprocket 24. The rear sprocket 24 is coupled to the rear wheel 6 and rotatable with respect to an axle of the rear wheel 6 to which the resultant rotational force from the chain 22 is applied.

In this embodiment, the seat 12 is rotatable around a rotational axis A1 which extends in a first direction (the left-right direction) of the bicycle 1 using a rotation mechanism 36 such as a rotatable fastening device (e.g. a bolt and a nut). The rotation mechanism 36 is attached to a seat adjusting mechanism 34 which enables the seat 12 to move in the horizontal direction. Specifically, the seat adjusting mechanism 34 enables the seat 12 to move in a second direction (the front-rear direction) of the bicycle 1. The seat adjusting mechanism 34 typically includes a rail extending in the front-rear direction of the bicycle 1 and a clamping device to fasten the rotation mechanism 36 to a specific position of the rail determined by a rider. The seat adjusting mechanism 34 is connected to a top end of a seatpost 11.

The seatpost 11 is received in a seattube 13. The seatpost 11 includes a seatpost adjusting mechanism 32 to position the seatpost 11 with respect to the seattube 13. The seatpost adjusting mechanism 32 may include a cramping device to fasten the seatpost 11 to the seattube 13 at a specific position of the seatpost 11 which is determined by a rider.

Alternatively, the seatpost 11 may be an adjustable seatpost. In the following description, such seatpost 11 can be referred to as an adjustable seatpost 11. The adjustable seatpost 11 may be a hydraulic adjustable seatpost or a mechanical driven adjustable seatpost. Each of the hydraulic adjustable seatpost and the mechanical driven adjustable seatpost has an upper cylinder and a lower cylinder. The seat adjusting mechanism 34 is attached to a top end of the upper cylinder. The lower cylinder is disposed in the seattube 13 and telescopically receives the upper cylinder. The adjustable seatpost 11 includes a seatpost adjusting mechanism 32 to position the upper cylinder with respect to lower cylinder.

In the hydraulic adjustable seatpost, typically, the upper cylinder has a first chamber, a second chamber, and a valve. An incompressible fluid (e.g. oil) is filled in the first chamber, and a compressible fluid (e.g. gas or air) is included in the second chamber. The second chamber may be divided into a first subchamber and a second subchamber by a movable piston. The first subchamber is filled in the compressible fluid. The second subchamber is filled in the incompressible fluid. The valve is disposed between the first chamber and the second chamber. In a case where the second chamber is divided into the first subchamber and the second subchamber, the valve is disposed between the first chamber and the second subchamber. The valve opens to cause the incompressible fluid to flow between the first chamber and the second chamber to change a volume of the first chamber. The entire volume of the second chamber is constant. When the valve is opened, the incompressible fluid passes through the valve to such that a pressure of the compressible fluid is equal to a pressure of the incompressible fluid. For example, when a rider press the seat 12 (e.g. a rider sits on the seat 12) while the valve is opened, the incompressible fluid flows out of the first chamber into the second chamber to compress the compressible fluid, thereby the volume of the first chamber is decreased. When a rider does not press the seat 12 (e.g. a rider stands up on the pedal 28) while the valve is opened, the incompressible fluid flows out of the second chamber into the first chamber due to a pressure of the compressible fluid, thereby the volume of the first chamber is increased. Accordingly, the valve can be referred to as the seatpost adjusting mechanism 32. An overall length of the adjustable seatpost 11 is substantially in proportion to the volume of the first chamber. The overall length of the adjustable seatpost 11 corresponds to a height of the seat 12.

In the mechanical driven adjustable seatpost, the seatpost adjusting mechanism 32 may be an actuator (e.g. a motor) attached to the lower cylinder or the seattube 13 to rotate a pinion on a rack attached to the upper cylinder to move the upper cylinder with respect to the lower cylinder to change an overall length of the adjustable seatpost 11. Alternatively, the actuator may be attached to one of the lower cylinder and the upper cylinder to rotate a ball screw. A female screw engaged with the ball screw is attached to the other of the lower cylinder and the upper cylinder. The actuator can rotate the ball screw to move the female screw to move the upper cylinder with respect to the lower cylinder to change an overall length of the adjustable seatpost 11.

Since the seat 12 is attached to the seatpost 11 via the rotation mechanism 36 and the seat adjusting mechanism 34, a height of the seat 12, a horizontal position of the seat 12 in the front-rear direction of the bicycle 1, and a rotational angle α of the seat 12 around the rotational axis A1 can be changed according to a rider's operation of the seat operation device 16 or by manually setting the seatpost adjusting mechanism 32, the seat adjusting mechanism 34, and the rotation mechanism 36. In the following description, the height of the seat 12 can be referred to as a seat height position. The horizontal position of the seat 12 can be defined, for example, as a longitudinal length from a rearmost horizontal position RHP of the seat 12 in the front-rear direction which can be adjusted to with the seat adjusting mechanism 34. The horizontal position of the seat 12 can be referred to as a seat horizontal position. The rotational angle α of the seat 12 can be referred to as a tilt angle α of the seat 12 and also referred to as a seat angle position. For example, the rotational angle α of the seat 12 can be defined as a clockwise angle from a counterclockwise rotational limit CCL viewed from the right of the bicycle 1. At least one of the seat height position, the seat angle position, and the seat horizontal position can be referred to as a seat position. In the embodiment, at least one of the rotation mechanism 36 and the seat adjusting mechanism 34 may be omitted. In this case, the seat 12 can be directly connected to the seatpost 11, and only the seat height position can be changed. In the embodiment, two of the seatpost adjusting mechanism 32, the rotation mechanism 36, and the seat adjusting mechanism 34 may be omitted. In this case, only one of the seat height position, the seat angle position, and the seat horizontal position can be changed.

In a case where the seat position can be changed according to a rider's operation of the seat operation device 16, the seatpost adjusting mechanism 32, the seat adjusting mechanism 34, and the rotation mechanism 36 include actuators. In a case where the adjustable seatpost 11 is the hydraulic adjustable seatpost, the seatpost adjusting mechanism 32 may include a valve actuator (e.g. a motor, or a control cable such as a Bowden cable coupled to the seat operation device 16) to open the valve. In a case where the adjustable seatpost 11 is the mechanical driven adjustable seatpost, the seatpost adjusting mechanism 32 may include a positioning device (e.g. a motor) to change an overall length of the adjustable seatpost 11. The valve actuator or the positioning device can be referred to as a seatpost actuator 33, which is shown in FIGS. 1 and 2. In addition, the seat adjusting mechanism 34 can include a motor to rotate a pinion on a rack extending in the front-rear direction of the bicycle 1. Alternatively, the seat adjusting mechanism 34 can include a female screw extending in the front-rear direction of the bicycle 1 and a motor. The female screw is attached to the rotation mechanism 36 and engaged with the ball screw. The motor can rotate a ball screw to move the female screw to move the rotation mechanism 36 with respect to the seatpost 11. Such motor can be referred to as a seat positioning actuator 35, which is shown in FIGS. 1 and 2. Further, the rotation mechanism 36 can include a motor to change the seat angle position. Such motor can be referred to as a tilt actuator 37, which is shown in FIGS. 1 and 2. Therefore, the bicycle 1 can include at least one of the seatpost actuator 33, the seat positioning actuator 35, and the tilt actuator 37. The at least one of the seatpost actuator 33, the seat positioning actuator 35, and the tilt actuator 37 can be referred to as a seat actuator 31 which is shown in FIG. 2.

Figure 3:
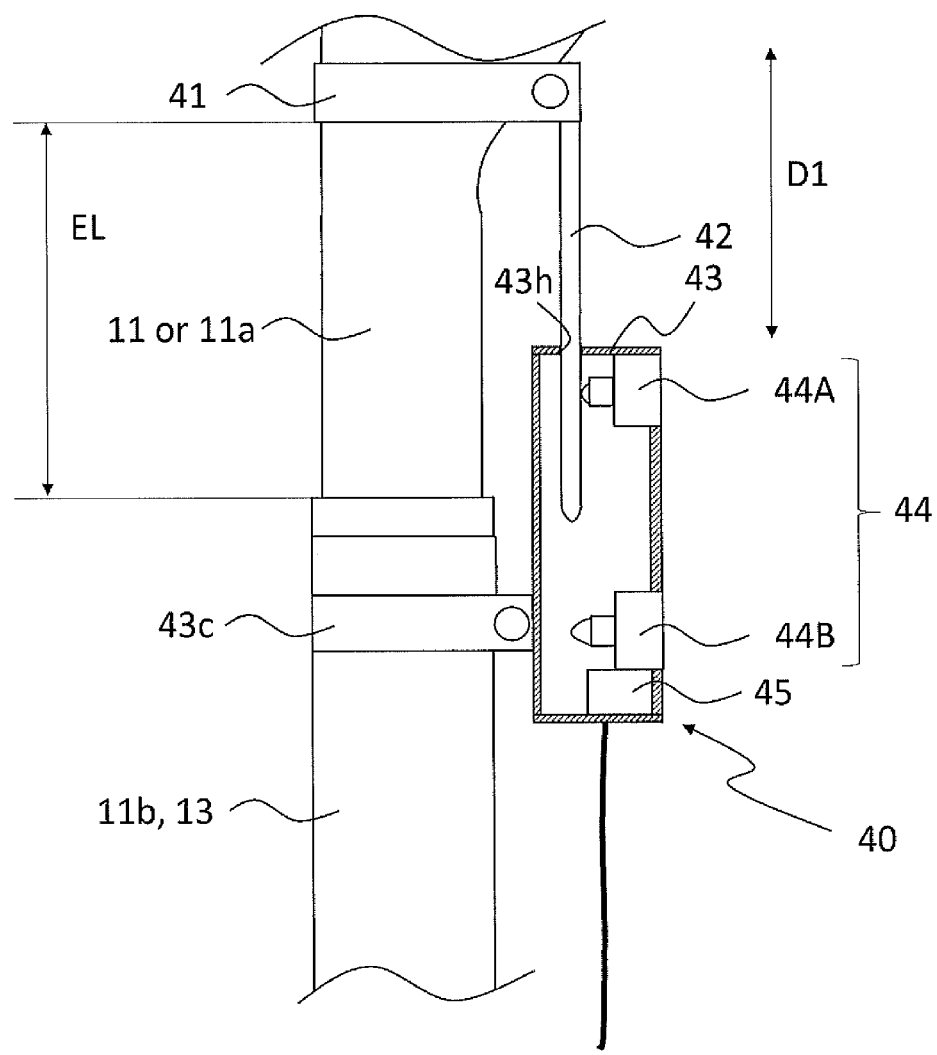
FIG. 3 is a simplified cross sectional view of a seat height position detector.

In addition, as shown in FIGS. 1 and 2, the bicycle 1 may further comprises a seat position detector 38 including at least one of a seat height position detector 40, a seat horizontal position detector 54, and a seat angle position detector 56 to detect the seat position. The seat height position detector 40 is attached to at least one of the seatpost 11, the seattube 13, and the seatpost adjusting mechanism 32 to detect the seat height position. As shown in FIG. 3, the seat height position detector 40 may include an operating member 42, at least one contact switch 44, and a signal transmitter 45. The operating member 42 may be a rod extending along a direction D1 of the telescopic movement of the seatpost 11. The operating member 42 is detachably mounted to the seatpost 11 with a clamping device 41 near the top end of the seatpost 11. In a case where the seatpost 11 is an adjustable seatpost, the operating member 42 may be detachably mounted to the upper cylinder 11*a* of the adjustable seatpost 11 with a clamping device 41 near a top end of the upper cylinder 11*a*. The at least one contact switch 44 is disposed in a detector holder 43. FIG. 3 shows two contact switches 44A and 44B as the at least one contact switch 44. The contact switch 44A is disposed above the contact switch 44B in a state where the detector holder 43 is attached to the bicycle 1. However, this is merely an example, and a total number of the at least one contact switch 44 is not limited in the embodiment of the present application. The total number of the at least one contact switch 44 may be one or more than two. The detector holder 43 has a clamping part 43*c* and a hole 43*h*. The detector holder 43 may be detachably mounted to the seattube 13 with the clamping part 43*c*. Alternatively, in a case where the seatpost 11 is an adjustable seatpost, the detector holder 43 may be detachably mounted to the lower cylinder 11*b* of the adjustable seatpost 11 with the clamping part 43*c*. The operating member 42 extends through the hole 43*h*.

The operating member 42 may move in accordance with the telescopic movement of the seatpost 11 as the seat height position is changed while the at least one contact switch 44 remains stationary with respect to the seattube 13. The top end position of the seatpost 11 corresponds to an extension length EL between the top end of the seatpost 11 and the top end of the seattube 13 along the direction D1. That is, the seat height position corresponds to the extension length EL. In a case where the seatpost 11 is an adjustable seatpost, a top end position of the seatpost 11 corresponds to an overall length of the adjustable seatpost 11. That is, the seat height position corresponds to the variable overall length of the adjustable seatpost 11.

In an example shown in FIG. 3, each of the contact switches 44A and 44B is positioned such that the operating member 42 contacts at least one of the contact switches 44A and 44B when the top end of the seatpost 11 reaches a corresponding predetermined positions. Specifically, each of the contact switches 44A and 44B is positioned in accordance with each of the predetermined extension lengths EL1 and EL2 (EL1>EL2) or each of the overall lengths L1, L2 (L1>L2) of the adjustable seatpost 11. When the operating member 42 does not contact any contact switch 44, the extension length is longer than EL1. In other words, the overall length of the adjustable seatpost 11 is longer than L1. When the operating member 42 contacts only the contact switch 44A, the extension length is longer than EL2 and less than or equal to EL1. In other words, the overall length of the adjustable seatpost 11 is longer than L2 and less than or equal to L1. When the operating member 42 contacts the contact switches 44A and 44B, the extension length is less than or equal to EL2. In other words, the overall length of the adjustable seatpost 11 is less than or equal to L2.

The signal transmitter 45 transmits an information related to the seat height position (e.g. whether or not each of the at least one contact switch 44 is contacting the operating member 42) to a seat controller 58 and/or an assist controller 62, which is described hereinafter.

Figure 4:
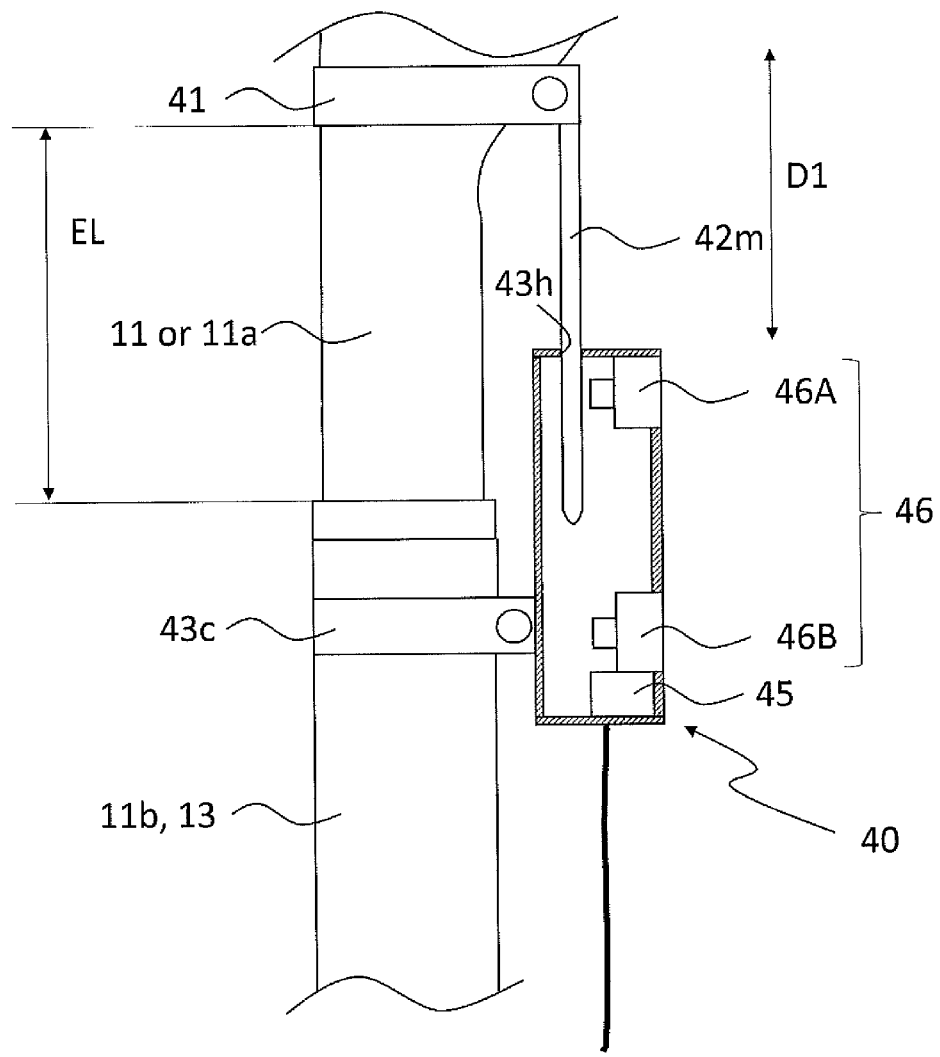
FIG. 4 is a simplified cross sectional view of a seat height position detector.

The seat height position detector 40 may have another mechanical configuration. As shown in FIG. 4, the seat height position detector 40 may include an operating member 42*m* and at least one magnetic sensor (e.g. a hall element) 46. FIG. 4 shows two magnetic sensors 46A and 46B as the at least one magnetic sensor 46. However, this is merely an example, and a total number of the at least one magnetic sensor 46 is not limited in the embodiment of the present application. The total number of the at least one magnetic sensor 46 may be one or more than two. The operating member 42*m* is a magnet rod. Each of the at least one magnetic sensor 46 is configured to detect a physical proximity to the operating member 42*m*. The signal transmitter 45 transmits whether or not each of the at least one magnetic sensor 46 is detecting the physical proximity as the information related to the seat height position. Other features of the operating member 42*m* and the at least one magnetic sensor 46 are same as those of the operating member 42 and the at least one contact switch 44, respectively.

Figure 5:
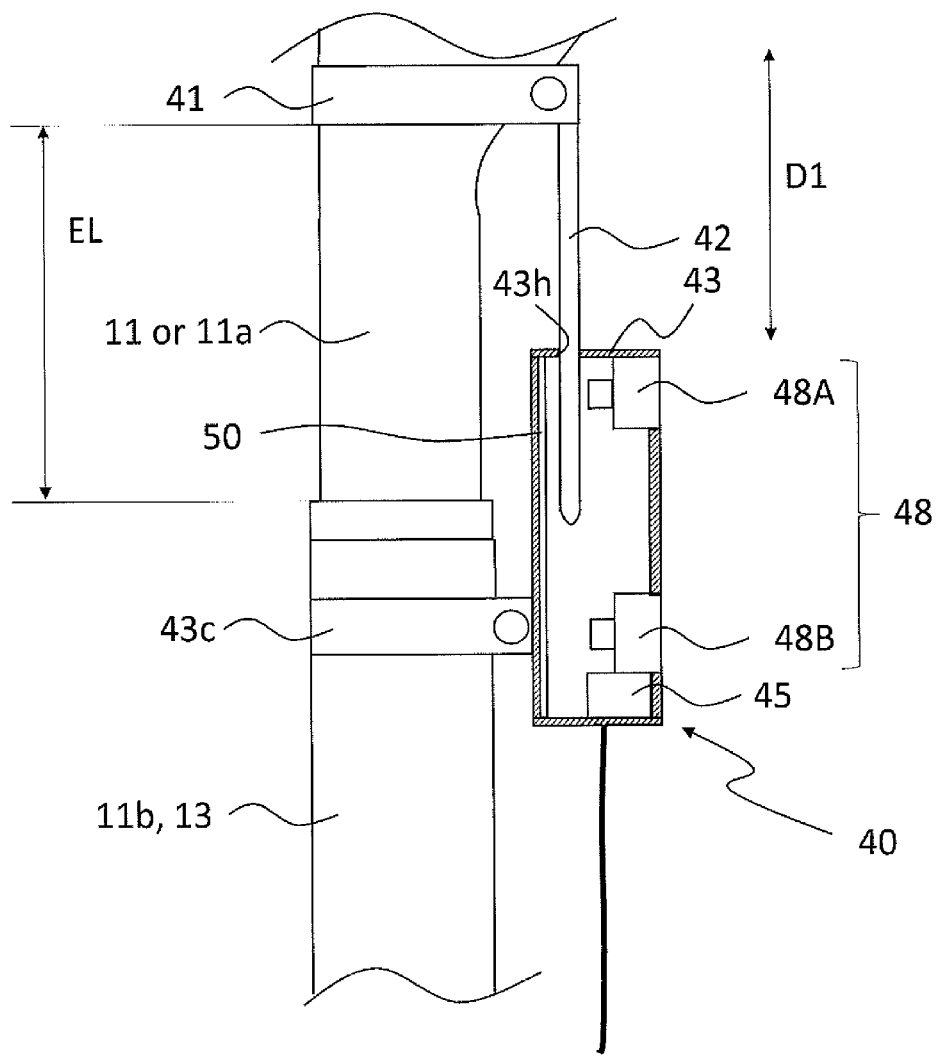
FIG. 5 is a simplified cross sectional view of a seat height position detector.

The seat height position detector 40 may have still another different mechanical configuration. As referred to FIG. 5, the seat height position detector 40 may include the operating member 42 and at least one optical switch 48 and a reflecting mirror 50. FIG. 5 shows two optical switches 48A and 48B as the at least one optical switch 48. However, this is merely an example, and a total number of the at least one optical switch 48 is not limited in the embodiment of the present application. The total number of the at least one optical switch 48 may be one or more than two. Each of the at least one optical switch 48 emits a light toward the reflecting mirror 50. When the operating member 42 does not shade the light, the light is reflected by the reflecting mirror 50 to return to the at least one optical switch 48. The at least one optical switch 48 detects whether the operating member 42 exists on an optical path through which the light emitted by the at least one optical switch 48 passes. The signal transmitter 45 transmits which optical path the operating member 42 is obstructing as the information related to the seat height position. By using such information, a tip position of the operating member 42 can be estimated. Other features of the at least one optical switch 48 are same as those of the at least one contact switch 44.

Figure 6:
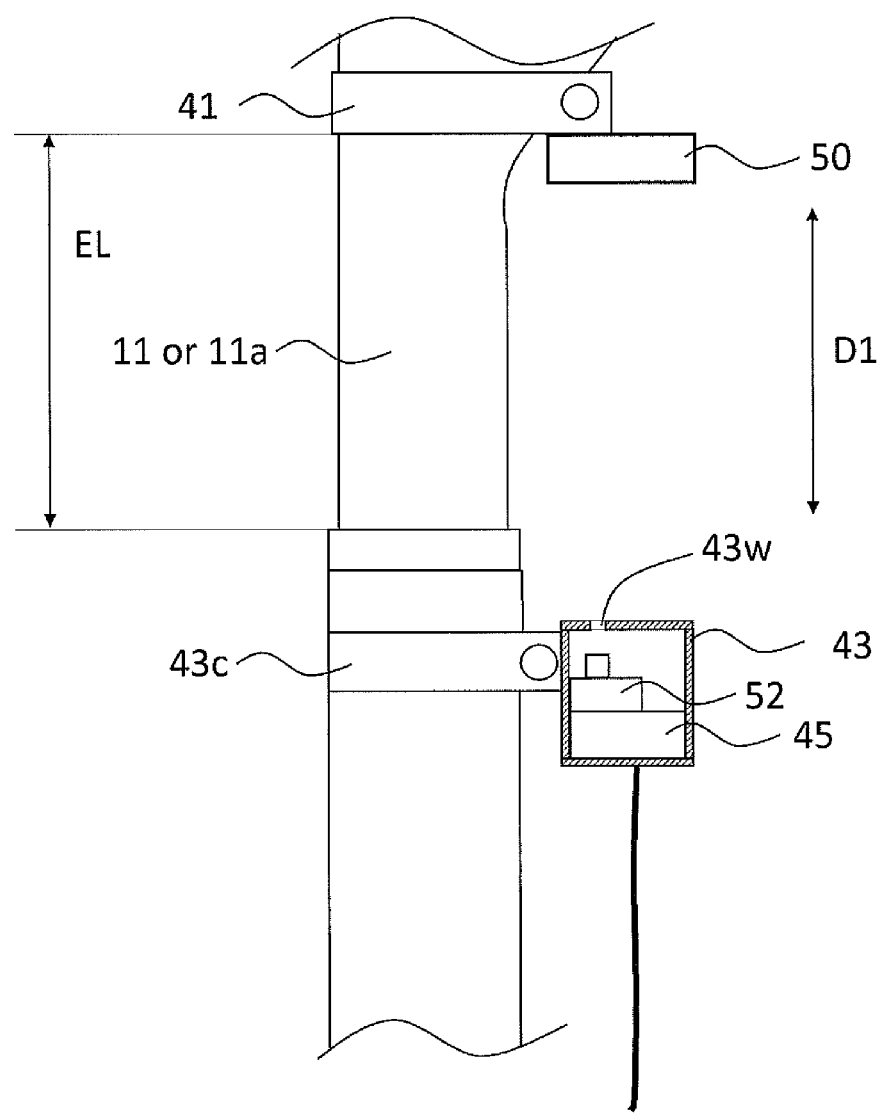
FIG. 6 is a simplified cross sectional view of a seat height position detector.

The seat height position detector 40 may have a further different mechanical configuration. As referred to FIG. 6, the seat height position detector 40 may include the reflecting mirror 50 and an optical distance sensor 52. The reflecting mirror 50 is detachably mounted to the seatpost 11 with a clamping device 41 near the top end of the seatpost 11. The optical distance sensor 52 is disposed in the detector holder 43. The optical distance sensor 52 emits a modulated light toward the reflecting mirror 50. The reflecting mirror 50 reflects the light to return it to the optical distance sensor 52. The detector holder 43 has a light transmission window 43w through which the light emitted by the optical distance sensor 52 and the light reflected by the reflecting mirror 50 can pass. The optical distance sensor 52 receives the reflected light to detect a phase difference between the emitted light and the received light to detect a distance between the reflecting mirror 50 and the optical distance sensor 52. Preferably, an offset value between the extension length EL and the distance detected by the optical distance sensor 52 or an offset value between the overall length of the adjustable seatpost 11 and the distance detected by the optical distance sensor 52 is calibrated in advance. By subtracting the calibrated offset from the distance detected by the optical distance sensor 52, the extension length EL or the overall length of the adjustable seatpost 11 can be obtained. The signal transmitter 45 transmits the distance detected by the optical distance sensor 52 as the information related to the seat height position.

The seat height position detector 40 may have a further different mechanical configuration, in a case where the seatpost 11 is the mechanical driven adjustable seatpost. In this case, the seat height position detector 40 may be a potentiometer attached to the actuator (e.g. motor) in the mechanical driven adjustable seatpost. The potentiometer can detect a rotational angle or a shift amount generated by the actuator, which corresponds to the extension length EL or the overall length of the adjustable seatpost 11. The signal transmitter 45 transmits the distance detected by the potentiometer as the information related to the seat height position.

In the above examples shown in FIGS. 3 to 5, the detector holder 43 including the at least one contact switch 44, the at least one magnetic sensor 46, or the at least one optical switch 48 may be detachably mounted to the seatpost 11 or the upper cylinder 11a of the adjustable seatpost 11 and the operating member 42 may be detachably mounted to the seattube 13 or the lower cylinder 11b of the adjustable seatpost 11. In the above examples shown in FIG. 6, the detector holder 43 including the optical distance sensor 52 may be detachably mounted to the seatpost 11 or the upper cylinder 11a of the adjustable seatpost 11 and the reflecting mirror 50 may be detachably mounted to the seattube 13 or the lower cylinder 11b of the adjustable seatpost 11. In this case, extension lengths EL1 and EL2 and the overall lengths L1, L2 should be defined in accordance with an arrangement of the sensor 46 or 52, or the switch 44 or 48, and the operating member 42 or 42m, or the reflecting mirror 50.

As referred back to FIGS. 1 and 2, the seat horizontal position detector 54 is attached to the seat adjusting mechanism 34 to detect the seat horizontal position. The seat horizontal position detector 54 can have a substantially same mechanical configuration as the seat height position detector 40 has. That is, the seat horizontal position detector 54 may include at least one contact switch, at least one magnetic sensor, at least one optical switch, an optical distance meter, or a potentiometer to detect, for example, the longitudinal length from the rearmost horizontal position RHP of the seat 12 in the front-rear direction. Further, the seat angle position detector 56 is attached to the rotation mechanism 36 to detect the seat angle position. Typically, the seat angle position detector 56 is a rotational potentiometer to be rotated around the rotational axis A1.

The battery 14 is coupled to, for example, the frame 2 or a rear carrier. Alternatively, the battery 14 may be coupled to both of the frame 2 and the rear carrier. The battery 14 supplies electric power to the drive unit 20, various electric sensors and actuators described above, the seat controller 58, and the assist controller 62. The seat operation device 16 is operated by a rider to change the seat position. For example, when a rider desires to increase the pedaling force typically at an uphill road, the rider can operate the seat operation device 16 to move the seat 12 upward and/or forward. Additionally or alternatively, the rider can operate the seat operation device 16 to tilt the seat 12 forward and downward. When a rider desires to have operability of the bicycle 1 increased typically at a downhill road, the rider can operate the seat operation device 16 to move the seat 12 downward and/or rearward. Additionally or alternatively, the rider can operate the seat operation device 16 to tilt the seat 12 backward and downward. The seat operation device 16 may include an operating member such as a button, a switch, or a lever for changing the seat position. FIG. 1 shows the seat operation device 16 which is attached to the handle bar 10. However, the seat operation device 16 may be attached to another component of the bicycle 1 which is different from the handle bar 10.

When the seat position can be changed according to a rider's operation of the seat operation device 16, as shown in FIGS. 1 and 2, the bicycle control device 100 may further comprises the seat controller 58. The seat operation device 16 is configured to receive a seat adjustment operation input by a rider. The seat adjustment operation indicates an operation to change the seat position. The seat operation device 16 is configured to generate a seat adjustment trigger in accordance with the seat adjustment operation to transmit the seat adjustment trigger to the seat controller 58. The seat adjustment trigger includes an information related to the seat position to be changed by the seat controller 58. The seat operation device 16 can transmit the seat adjustment trigger to the seat controller 58 via wireless communication. However, the seat operation device 16 may transmit the seat adjustment trigger to the seat controller 58 via wired communication. The seat adjustment trigger can be encoded based on the communication protocol between the seat operation device 16 and the seat controller 58. The seat operation device 16 may transmit the seat adjustment trigger to the assist controller 62, too. The seat controller 58 receives the seat adjustment trigger. The seat controller 58 is configured to control the seat actuator 31 to change the seat position based on the seat adjustment trigger. Alternatively, in a case the seatpost actuator 33 includes the control cable coupled to the seat operation device 16, the seat operation device 16 may generate a movement of the control cable to open or close the valve. Such control cable movement may be the seat adjustment trigger.

As shown in FIG. 2, the seat controller 58 includes a processor 58A and a memory 58B. The processor 58A typically includes a central processing unit (CPU) and a memory controller. The memory 58B is connected to the processor 58A. The memory 58B may include a nontransitory computer-readable storage medium (e.g. ROM) and a transitory computer-readable storage medium (e.g. RAM, a flash memory). The processor 58A controls the memory 58B to store data in the storage areas of the memory 58B and reads data from the storage areas of the memory 58B. The memory 58B (e.g., the ROM) stores a program. The program is read into the processor 58A, and thereby functions of seat controller 58 is executed.

For example, in a case where the seatpost 11 is the hydraulic adjustable seatpost, the seat adjustment operation includes an operation to change the overall length of the adjustable seatpost 11 such as an operation of touching the operating member. The seat adjustment trigger may include a control signal to the valve actuator (the seatpost actuator 33) for opening the valve. In this case, the seat adjustment trigger include an information only indicating that the seat position is to be changed. The seat controller 58 receives the seat adjustment trigger while the seat adjustment operation is input to control the seatpost actuator 33 to change the overall length of the adjustable seatpost 11. Accordingly, the seat controller 58 is configured to control the seat actuator 31 to change a variable overall length of the adjustable seatpost 11 based on the seat adjustment trigger. The seat actuator 31 changes the seat position while the seat adjustment operation is input.

In a case where the seatpost 11 is the mechanical driven adjustable seatpost, the seat adjustment operation can include inputting a seat setting value related to the variable overall length, for example, by shifting a switch or a lever of the seat operation device 16. The seat setting value related to the variable overall length may include one of several preset overall lengths $PL_i$ (i denotes an integer. i>1) of the adjustable seatpost 11 to be changed by the seat controller 58. The seat adjustment trigger includes information related to the seat setting value. Specifically, the seat adjustment trigger may include a control signal to the positioning device (the seatpost actuator 33) for adjusting the overall length to a selected preset overall length. The seat adjustment trigger includes an information indicating that the seat position is to be adjusted to the selected preset overall length. The seat controller 58 receives the seat adjustment trigger to control the seatpost actuator 33 to adjust the overall length of the adjustable seatpost 11 to the selected preset overall length. Accordingly, the seat controller 58 is configured to control the seat actuator 31 to change a variable overall length of the adjustable seatpost 11 based on the seat adjustment trigger. The seat actuator 31 changes the variable overall length in accordance with the seat setting value. In the following description, such adjustable seatpost 11 can be referred to as a stepped mechanical driven adjustable seatpost.

Alternatively, the seat adjustment operation can include an operation to increase the overall length of the adjustable seatpost 11, for example, by shifting a switch or a lever of the seat operation device 16 to a first direction and an operation to decrease the overall length of the adjustable seatpost 11, for example, by shifting the switch or the lever to a second direction different from the first direction. The seat adjustment trigger may include a control signal to the positioning device (the seatpost actuator 33) for increasing/decreasing the overall length of the adjustable seatpost 11. In this case, the seat adjustment trigger include an information indicating that the seat height position is to be raised or lowered. The seat controller 58 receives the seat adjustment trigger while the seat adjustment operation is input to control the seatpost actuator 33 to change the overall length of the adjustable seatpost 11. Accordingly, the seat controller 58 is configured to control the seat actuator 31 to change a variable overall length of the adjustable seatpost 11 based on the seat adjustment trigger. The seat actuator 31 changes the seat position while the seat adjustment operation is input. In the following description, such adjustable seatpost 11 can be referred to as a stepless mechanical driven adjustable seatpost.

In addition, the seat adjustment operation may include inputting a seat setting value related to a horizontal position of the seat 12 in the front-rear direction of the bicycle 1. The seat adjustment trigger may include a control signal to the seat positioning actuator 35 for positioning the seat 12 in the front-rear direction of the bicycle 1. The seat setting value related to the horizontal position of the seat 12 may include one of several preset horizontal positions $HP_i$ (i denotes an integer. i>1) of the seat 12 to be changed by the seat controller 58. The seat adjustment trigger includes information related to the seat setting value. Specifically, the seat adjustment trigger includes an information indicating that the seat position is to be adjusted to the selected preset horizontal position. The seat controller 58 receives the seat adjustment trigger to control the seat positioning actuator 35 to adjust the horizontal position of the seat 12 to the selected preset horizontal position. The seat positioning actuator 35 changes the horizontal position of the seat 12 in accordance with the seat setting value. In the following description, such seat adjusting mechanism 34 can be referred to as a stepped seat adjusting mechanism.

Alternatively, the seat adjustment operation can include an operation to increase the longitudinal length from the rearmost horizontal position RHP of the seat 12 in the front-rear direction, for example, by shifting a switch or a lever of the seat operation device 16 to a first direction and an operation to decrease the longitudinal length, for example, by shifting the switch or the lever to a second direction different from the first direction. The seat adjustment trigger may include a control signal to the seat adjusting mechanism 34 (the seat positioning actuator 35) for increasing/decreasing the seat horizontal position. In this case, the seat adjustment trigger includes an information indicating that the seat horizontal position is to be moved forward or backward. The seat controller 58 receives the seat adjustment trigger while the seat adjustment operation is input to control the seat positioning actuator 35 to change the seat horizontal position. Accordingly, the seat controller 58 is configured to control the seat positioning actuator 35 to change the seat horizontal position based on the seat adjustment trigger. The seat positioning actuator 35 changes the seat horizontal position while the seat adjustment operation is input. In the following description, such seat adjusting mechanism 34 can be referred to as a stepless seat adjusting mechanism.

Further, the seat adjustment operation may include inputting a seat setting value related to a rotational angle of the seat 12 around the rotational axis A1. The seat adjustment trigger may include a control signal to the tilt actuator 37 for positioning the seat 12 in the front-rear direction of the bicycle 1. The seat setting value related to the rotational angle of the seat 12 may include one of several preset angles $p\alpha_i$ (i denotes an integer. i>1) of the seat 12 to be changed by the seat controller 58. The seat adjustment trigger includes information related to the seat setting value. Specifically, the seat adjustment trigger includes an information indicating that the rotational angle of the seat 12 is to be adjusted to the selected preset angle. The seat controller 58 receives the seat adjustment trigger to control the tilt actuator 37 to adjust the rotational angle of the seat 12 to the selected preset angle. The tilt actuator 37 changes the rotational angle of the seat 12 in accordance with the seat setting value. In the following description, such rotation mechanism 36 can be referred to as a stepped rotation mechanism.

Alternatively, the seat adjustment operation can include an operation to increase the rotational angle of the seat 12 around the rotational axis A1, for example, by shifting a switch or a lever of the seat operation device 16 to a first direction and an operation to decrease the rotational angle of the seat 12, for example, by shifting the switch or the lever to a second direction different from the first direction. The seat adjustment trigger may include a control signal to the rotation mechanism 36 (the tilt actuator 37) for increasing/decreasing the rotational angle of the seat 12. In this case, the seat adjustment trigger include an information indicating that the seat horizontal position is to be increased or decreased. The seat controller 58 receives the seat adjustment trigger while the seat adjustment operation is input to control the tilt actuator 37 to change the seat angle position. Accordingly, the seat controller 58 is configured to control the tilt actuator 37 to change the seat angle position based on the seat adjustment trigger. The tilt actuator 37 changes the seat angle position while the seat adjustment operation is input. In the following description, such rotation mechanism 36 can be referred to as a stepless rotation mechanism.

The bicycle 1 further comprises the assist controller 62 to control the assist actuator 30. The functionality of the assist controller 62 and the bicycle control system 200 are described in detail hereinafter.

As shown in FIG. 2, the bicycle control system 200 comprises a bicycle control device 100, the seatpost 11, and the assist actuator 30. In a case where the seatpost 11 is the adjustable seatpost, the bicycle control system 200 may comprise a bicycle control device 100, the adjustable seatpost 11, and the assist actuator 30. The seatpost 11 includes the seatpost adjusting mechanism 32. The bicycle control system 200 may further comprise the assist actuator 30, the seat actuator 31, the seat adjusting mechanism 34, and the rotation mechanism 36. The seat actuator 31 may comprise at least one of the seatpost actuator 33, the seat positioning actuator 35, and the tilt actuator 37.

The bicycle control device 100 comprises a seat information generator 60 and the assist controller 62. The seat information generator 60 is configured to generate seat information. As shown in FIG. 2, the seat information generator 60 can include the seat position detector 38. In a case where the seat information generator 60 includes the seat position detector 38, the seat information includes the seat position, and generating the seat information by the seat information generator 60 means detecting the seat position by the seat position detector 38. The seat position detector 38 may include at least one of the seat height position detector 40, the seat horizontal position detector 54, and the seat angle position detector 56. Accordingly, the seat information generator 60 can include the seat position detector 38 to detect the seat position corresponding to at least one of the seat height position, the seat angle position, and the seat horizontal position.

In addition, the seat information generator 60 can include the seat operation device 16. As described earlier, the seat operation device 16 is configured to generate the seat adjustment trigger including information related to the seat position to be changed by the seat controller 58. Accordingly, in a case where the seat information generator 60 includes the seat operation device 16, the seat information includes the seat adjustment trigger, and generating the seat information by the seat information generator 60 means generating the seat adjustment trigger by the seat operation device 16.

FIG. 2 shows the seat information generator 60 includes both the seat operation device 16 and the seat position detector 38, but the seat information generator 60 may include either the seat operation device 16 or the seat position detector 38. The seat position detector 38 may not include all of the seat height position detector 40, the seat horizontal position detector 54, and the seat angle position detector 56. The seat position detector 38 may include at least one of the seat height position detector 40, the seat horizontal position detector 54, and the seat angle position detector 56.

As shown in FIG. 2, the bicycle control device 100 may further comprise a driving force detector 64. The driving force detector 64 is configured to detect the driving force. The driving force detector 64 may be a crankshaft torque sensor attached to the crankshaft 26 or a pressure sensor attached to the pedal 28 to detect the driving force. Alternatively, the driving force detector 64 may include a driving force calculator and one of a chain tension sensor attached to the chain 22 and a rear wheel torque sensor attached to at least one of the rear sprocket 24 and the hub of the rear wheel 6. The one of the chain tension sensor and the rear wheel torque sensor can detect the resultant rotational force from the crankshaft 26. The driving force calculator can receive a control signal to the assist actuator 30 from the assist controller 62 and the resultant rotational force from the one of the chain tension sensor and the rear wheel torque sensor. Then, the driving force calculator can calculate the assisting force based on the control signal to the assist actuator 30 and obtain the driving force by subtracting the assisting force from the resultant rotational force.

The assist controller 62 is configured to control the assist actuator 30 to assist the driving force of the bicycle 1 based on the seat information, and to change an assist ratio of the assisting force to the driving force based on the seat information. Specifically, the assist controller 62 receives the driving force from the driving force detector 64 and the seat information from the seat information generator 60. Then, the assist controller 62 sets the assist ratio based on the seat information, and controls the assist actuator 30 to generate the assisting force based on the assist ratio and the driving force received from the driving force detector 64.

The assist controller 62 includes a processor 62A and a memory 62B. The processor 62A has a substantially same structure as the processor 58A has, and the memory 62B has a substantially same structure as the memory 58B has, but a program stored in the memory 62B is different from that stored in the memory 58B. The program stored in the memory 62B is read into the processor 62A, and thereby functions of the assist controller 62 is executed. The processor 58A and the processor 62A may be integrated into a single processor. The memory 58B and the memory 62B may be integrated into a single memory.

In this embodiment, the assist controller 62 sets the assist ratio in accordance with at least one of the following rules.

(Rule 1) The assist controller 62 increases the assist ratio when the extension length EL of the seatpost 11 increases. In a case where the seatpost 11 is the adjustable seatpost, the assist controller 62 increases the assist ratio when the variable overall length of the adjustable seatpost 11 increases. The assist controller 62 decreases the assist ratio when the extension length EL of the seatpost 11 decreases. In a case where the seatpost 11 is the adjustable seatpost, the assist controller 62 decreases the assist ratio when the variable overall length of the adjustable seatpost 11 decreases.

In Rule 1, the memory 62B stores an assist ratio and a corresponding seatpost length range which indicates a range of the extension length or a range of the overall length of the seatpost 11. For example, the memory 49 may store several threshold values to define the ranges of the extension length EL such as $EL_1, EL_2, \ldots, EL_{i-1}, EL_i, \ldots, EL_{n-1}$ ($EL_1 < EL_2 < \ldots < EL_{i-1} < EL_i < \ldots < EL_{n-1}$) (i denotes an integer larger than 2. n denotes an integer larger than 2.). Alternatively, the memory 49 may store several thresholds to define the ranges of the overall length such as $PL_1, PL_2, \ldots, PL_{i-1}, PL_i, \ldots, PL_{n-1}$ ($PL_1 < PL_2 < \ldots < PL_{i-1} < PL_i < \ldots < PL_{n-1}$) (i denotes an integer larger than 2. n denotes an integer larger than 2.). In addition, the memory 49 stores assist ratios such as $R_1, R_2, \ldots, R_i, \ldots, R_n$ ($R_1 < R_2 < \ldots < R_i < \ldots < R_n$) corresponding to the seatpost length ranges of $[EL_{min}, EL_1), [EL_1, EL_2), \ldots, [EL_{i-1}, EL_i), \ldots, [EL_{n-1}, EL_{max}]$, respectively. Alternatively, $R_1, R_2, \ldots, R_i, \ldots, R_n$ ($R_1 < R_2 < \ldots < R_i < \ldots < R_n$) may correspond to the seatpost length ranges of $[EL_{min}, EL_1], (EL_1, EL_2], (EL_{i-1}, EL_i], \ldots, (EL_{n-1}, EL_{max}]$, respectively. In a case where the seatpost 11 is the adjustable seatpost, the memory 49 may store assist ratios such as $R_1, R_2, \ldots, R_i, \ldots, R_n$ ($R_1 < R_2 < \ldots < R_i < \ldots < R_n$) corresponding to the seatpost length ranges of $[PL_{min}, PL_1), [PL_1, PL_2), \ldots, [PL_{i-1}, PL_i), \ldots [PL_{n-1}, PL_{max}]$, respectively. Alternatively, $R_1, R_2, \ldots, R_i, \ldots, R_n$ ($R_1 < R_2 < \ldots < R_i < \ldots < R_n$) may correspond to the seatpost length ranges of $[PL_{min}, PL_1], (PL_1, PL_2], \ldots, (PL_{i-1}, PL_i], \ldots, (PL_{n-1}, PL_{max}]$, respectively. In the above range definitions, [a, b] denotes a closed interval. [a, b) denotes a left-closed and right-open interval. (a, b] denotes a left-open and right-closed interval. $EL_{min}$ denotes a minimum extension length of the seatpost 11. $EL_{max}$ denotes a maximum extension length of the seatpost 11. $PL_{min}$ denotes a minimum overall length of the adjustable seatpost 11. $PL_{max}$ denotes a maximum overall length of the adjustable seatpost 11.

In a case where the operating member 42 is mounted to the seatpost 11 near the top end of the seatpost 11, each of the at least one contact switch 44, each of the at least one magnetic sensor 46, or each of the at least one optical switch 48 is disposed at a lowest position among possible positions where the operating member 42 can be sensed by each of the at least one contact switch 44, the at least one magnetic sensor 46, or the at least one optical switch 48, respectively when the extension length or the overall length of the adjustable seatpost 11 is equal to each threshold value. In a case where the operating member 42 is mounted to the seattube 13 or the lower cylinder of the adjustable seatpost 11, each of the at least one contact switch 44, each of the at least one magnetic sensor 46, or each of the at least one optical switch 48 is disposed at a highest position among possible positions where the operating member 42 can be sensed by each of the at least one contact switch 44, the at least one magnetic sensor 46, or the at least one optical switch 48, respectively when the extension length or the overall length of the adjustable seatpost 11 is equal to each threshold value. In an example shown in FIGS. 2 to 4, n is equal to 2, and the contact switch 44A, the magnetic sensor 46A, or the optical switch 48A is disposed at a lowest position of possible positions where the operating member 42 can be sensed by the contact switch 44A, the magnetic sensor 46A, or the optical switch 48A, respectively when the extension length is equal to EL2 or the overall length of the adjustable seatpost 11 is equal to PL2. The contact switch 44B, the magnetic sensor 46B, or the optical switch 48B is disposed at a lowest position among possible positions where the operating member 42 can be sensed by the contact switch 44B, the magnetic sensor 46B, or the optical switch 48B, respectively when the extension length is equal to EL1 or the overall length of the adjustable seatpost 11 is equal to PL1.

The assist controller 62 receives the information related to the seat height position from seat height position detector 40 and determines the seatpost length range. For example, in a case where the adjustable seatpost 11 is the hydraulic adjustable seatpost or the stepless mechanical driven adjustable seatpost, the assist controller 62 receives an information related to an extension length or an overall length of the seatpost 11 from the seat height position detector 40, then the assist controller 62 determines the seatpost length range based on the information. However, in a case where the adjustable seatpost 11 is the stepped mechanical driven adjustable seatpost, the assist controller 62 can receive information related to the seatpost length range (the seat setting value in the seat adjustment trigger) directly from the seat operation device 16. In this case, the assist controller 62 doesn't have to receive the information related to the extension length or the overall length of the seatpost 11 from the seat height position detector 40. After that, the assist controller 62 refers to the memory 62B to determine the assist ratio based on the seatpost length range. In a case where the assist controller 62 can receive the seat setting value in the seat adjustment trigger, the assist controller 62 increases the assist ratio when the seat setting value indicates the variable overall length is increased. The assist controller 62 decreases the assist ratio when the seat setting value indicates the variable overall length is decreased.

(Rule 2) The assist controller 62 increases the assist ratio when the seat horizontal position changes forward. The assist controller 62 decreases the assist ratio when the seat horizontal position changes backward.

In Rule 2, the memory 62B may store an assist ratio and a corresponding seat horizontal position range which indicates a range of the horizontal position of the seat 12 in the front-rear direction of the bicycle 1. The memory 49 may store several threshold values to define the ranges of the longitudinal length, which can define the seat horizontal position, such as $LL_1, LL_2, \ldots, LL_{i-1}, LL_i, \ldots, LL_{n-1}$ ($LL_1 < LL_2 < \ldots < LL_{i-1} < LL_i < \ldots < LL_{n-1}$) (i denotes an integer larger than 2. n denotes an integer larger than 2). The longitudinal length is defined by a distance between a present seat horizontal position and the rearmost horizontal position RHP of the seat 12 in the front-rear direction. In addition, the memory 49 stores assist ratios such as $R_1, R_2, \ldots, R_n$ ($R_1 < R_2 < \ldots < R_i < \ldots < R_n$) corresponding to the ranges of the longitudinal length $[LL_{min}, LL_1), [LL_1, LL_2), \ldots, [LL_{i-1}, LL_i), \ldots, [LL_{n-1}, LL_{max}]$, respectively. Alternatively, $R_1, R_2, \ldots, R_i, \ldots, R_n$ ($R_1 < R_2 < \ldots < R_i < \ldots < R_n$) may correspond to the longitudinal length ranges of $[LL_{min}, LL_1], (LL_1, LL_2], \ldots, (LL_{i-1}, LL_i], \ldots, (LL_{n-1}, LL_{max}]$, respectively. In the above range definitions, [a, b] denotes a closed interval. [a, b) denotes a left-closed and right-open interval. (a, b] denotes a left-open and right-closed interval. $LL_{min}$ denotes a minimum longitudinal length of the seat 12. $LL_{max}$ denotes a maximum longitudinal length of the seat 12. When the longitudinal length of the seat 12 is equal to $LL_{min}$, the seat 12 is positioned at the rearmost horizontal position RHP (FIG. 1). When the longitudinal length of the seat 12 is equal to $LL_{max}$, the seat 12 is positioned at a forefront horizontal position FHP (FIG. 1).

The assist controller 62 receives the information related to the seat horizontal position from seat horizontal position detector 54 and determines the seat horizontal position range. For example, the assist controller 62 may receive, from the seat horizontal position detector 54, information related to a longitudinal length from the rearmost horizontal position RHP of the seat 12 in the front-rear direction, then the assist controller 62 determines the seat horizontal position range based on the information. However, in a case where the seat adjusting mechanism 34 is the stepped seat adjusting mechanism, the assist controller 62 can receive information related to the seatpost length range (the seat setting value in the seat adjustment trigger) directly from the seat operation device 16. In this case, the assist controller 62 doesn't have to receive the information related to the seat horizontal position (the longitudinal length) from the seat horizontal position detector 54. Then, the assist controller 62 refers to the memory 62B to determine the assist ratio based on the seat horizontal position range. In a case where the assist controller 62 can receive the seat setting value in the seat adjustment trigger, the assist controller 62 increases the assist ratio when the seat setting value indicates the seat horizontal position moves forward. The assist controller 62 decreases the assist ratio when the seat setting value indicates the seat horizontal position moves backward.

(Rule 3) The assist controller 62 increases the assist ratio when the seat 12 is tilted forward and downward. In other words, the assist controller 62 increases the assist ratio when the seat 12 rotates around the rotational axis A1 clockwise viewed from the right of the bicycle 1. In a case where the rotational angle $\alpha$ of the seat 12 increases when the seat 12 rotates around the rotational axis A1 clockwise viewed from the right of the bicycle 1, the assist controller 62 increases the assist ratio when the seat angle position increases.

The assist controller 62 decreases the assist ratio when the seat 12 is tilted backward and downward. In other words, the assist controller 62 decreases the assist ratio when the seat 12 rotates around the rotational axis A1 counterclockwise viewed from the right of the bicycle 1. In a case where the rotational angle $\alpha$ of the seat 12 decreases when the seat 12 rotates around the rotational axis A1 counterclockwise viewed from the right of the bicycle 1, the assist controller 62 decreases the assist ratio when the seat angle position decreases.

In Rule 3, the memory 62B may store an assist ratio and a corresponding seat angle position range which indicates a range of the rotational angle $\alpha$ of the seat 12 around the rotational axis A1. For example, the rotational angle $\alpha$ of the seat 12 increases when the seat 12 rotates around the rotational axis A1 clockwise viewed from the right of the bicycle 1. In this case, the memory 49 may store several threshold values to define the ranges of the rotational angle $\alpha$ such as $\alpha_1, \alpha_2, \ldots, \alpha_{i-1}, \alpha_i, \ldots, \alpha_{n-1}$ ($\alpha_1 < \alpha_2 < \ldots < \alpha_{i-1} < \alpha_i < \ldots \alpha_{n-1}$) (i denotes an integer larger than 2. n denotes an integer larger than 2). In addition, the memory 49 stores assist ratios such as $R_1, R_2, \ldots, R_i, \ldots, R_n$ ($R_1 < R_2 < \ldots < R_i < \ldots < R_n$) corresponding to rotational angle ranges such as $[\alpha_{min}, \alpha_1), [\alpha_1, \alpha_2), \ldots, [\alpha_{i-1}, \alpha_i), \ldots, [\alpha_{n-1}, \alpha_{max}]$, respectively. Alternatively, $R_1, R_2, \ldots, R_n$ ($R_1 < R_2 < \ldots < R_i < \ldots < R_n$) may correspond to the rotational angle ranges such as $[\alpha_{min}, \alpha_1], (\alpha_1, \alpha_2], \ldots, (\alpha_{i-1}, \alpha_i], \ldots, (\alpha_{n-1}, \alpha_{max}]$, respectively. In the above range definitions, [a, b] denotes a closed interval. [a, b) denotes a left-closed and right-open interval. (a, b] denotes a left-open and right-closed interval. $\alpha_{min}$ denotes a minimum rotational angle of the seat 12. $\alpha_{max}$ denotes a maximum rotational angle of the seat 12. When $\alpha$ is equal to $\alpha_{min}$, the seat 12 is tilted to the counterclockwise rotational limit CCL (FIG. 1). When $\alpha$ is equal to $\alpha_{max}$, the seat 12 is tilted to a clockwise rotational limit CWL (FIG. 1).

The assist controller 62 receives the information related to the rotational angle $\alpha$ of the seat 12 and determines the seat angle position range. For example, in a case where the rotation mechanism 36 is the stepless rotation mechanism, the assist controller 62 receives, from the seat angle position detector 56, an information related to the rotational angle $\alpha$ from the counterclockwise rotational limit CCL of the seat 12, then the assist controller 62 determines the seat angle position range based on the information. However, in a case where the rotation mechanism 36 is the stepped rotation mechanism, the assist controller 62 can receive information related to the seat angle position range (the seat setting value in the seat adjustment trigger) directly from the seat operation device 16. In this case, the assist controller 62 doesn't have to receive, from the seat angle position detector 56, the information related to the rotational angle $\alpha$ of the seat 12. After that, the assist controller 62 refers to the memory 62B to determine the assist ratio based on the seat angle position range. In a case where the assist controller 62 can receive the seat setting value in the seat adjustment trigger, the assist controller 62 increases the assist ratio when the seat setting value indicates the seat 12 is rotated to be tilted forward and downward. The assist controller 62 decreases the assist ratio when the seat setting value indicates the seat 12 is rotated to be tilted forward and downward.

The bicycle control device 100 may further comprise an I/O (input/output) interface 66 electrically connected to the assist controller 62. The I/O interface 66 may include a cycle computer, or a communication interface to be connected to a personal computer or a mobile terminal (a cellular phone, a tablet PC, etc.). An operator (e.g. a bicycle dealer or a rider) can set or rewrite the assist ratio and/or the corresponding threshold values via the I/O interface 66 by operating the cycle computer, the personal computer or the mobile terminal.

The bicycle control device 100 and the bicycle control system 200 has the following features.

(1) The bicycle control device 100 comprises the seat information generator 60 and the assist controller 62. The seat information generator 60 is configured to generate seat information. The assist controller 62 is configured to control the assist actuator 30 to assist a driving force of the bicycle 1 based on the seat information. Thus, it is possible to change the driving force based on the seat information. The seat information is related to a rider's posture on the bicycle and a rider's pedaling load to move the bicycle forward. Accordingly, it can alleviate a load of a rider's foot or increase operability of the bicycle 1.

(2) The bicycle control device 100 further comprises the driving force detector 64. The driving force detector 64 is configured to detect the driving force. The assist controller 62 is configured to control the assist actuator 30 to generate an assisting force based on the driving force, and to change an assist ratio of the assisting force to the driving force based on the seat information. Thus, it is possible to change the assist ratio based on the seat information. The seat information is related to a rider's posture on the bicycle and a rider's pedaling load to move the bicycle forward. Accordingly, it can alleviate a load of a rider's foot or increase operability of the bicycle 1.

(3) The seat information generator 60 includes the seat position detector 38 to detect a seat position corresponding to at least one of seat height position, seat angle position, and seat horizontal position. The seat information includes the seat position. Thus, it is possible to change the assist ratio based on at least one of seat height position, seat angle position, and seat horizontal position. When a rider goes up a hill with the bicycle 1, a rider usually desires to raise the seat 12, move the seat 12 forward, tilt the seat 12 forward and downward to facilitate an increase of the pedaling force. When a rider goes down a hill with the bicycle 1, a rider usually desires to lower the seat 12, move the seat 12 backward, tilt the seat 12 backward and downward to increase operability of the bicycle 1. Accordingly, it can alleviate a load of a rider's foot or increase operability of the bicycle 1.

(4) The seat height position corresponds to a variable overall length of the adjustable seatpost 11. The assist controller 62 increases the assist ratio when the variable overall length increases. Thus, it is possible to increase the assist ratio when the seat 12 is raised. Accordingly, it can alleviate a load of a rider's foot.

(5) The seat height position corresponds to a variable overall length of the adjustable seatpost 11. The assist controller 62 decreases the assist ratio when the variable overall length decreases. Thus, it is possible to decrease the assist ratio when the seat 12 is lowered. Accordingly, it can increase operability of the bicycle.

(6) The seat information generator 60 includes the seat operation device 16 configured to receive a seat adjustment operation input by a rider. The seat operation device 16 is configured to generate a seat adjustment trigger in accordance with the seat adjustment operation to transmit the seat adjustment trigger to the seat controller 58. Thus, it is possible to change the assist ratio based on the seat adjustment trigger. Accordingly, a performance of the bicycle control device 100 can be enhanced.

(7) The seat operation device 16 transmits the seat adjustment trigger to the seat controller 58 via wireless communication. Thus, a communication cable between the seat operation device 16 and the seat controller 58 can be omitted. Accordingly, it enhances a design flexibility of the bicycle 1.

(8) The bicycle control device 100 further comprises the seat controller 58 configured to control the seat actuator 31 to change the seat position based on the seat adjustment trigger. Thus, it is possible for a rider to operate the seat controller 58 to change the seat position. Accordingly, the rider can easily change the seat position while the rider pedals the bicycle 1.

(9) The seat actuator 31 changes the seat position while the seat adjustment operation is input. Thus, a rider can continuously change the seat position by adjusting a time length to input the seat adjustment operation. Accordingly, the rider can change the seat position flexibly.

(10) The bicycle control device 100 further comprises the seat controller 58 configured to control the seat actuator 31 to change a variable overall length of the adjustable seatpost 11 based on the seat adjustment trigger. The seat height position corresponds to the variable overall length. Thus, it is possible for a rider to operate the seat controller 58 to change the seat height position. Accordingly, the rider can easily change the seat height position while the rider pedals the bicycle.

(11) The seat adjustment operation includes inputting a seat setting value related to the variable overall length. The seat adjustment trigger includes information related to the seat setting value. The seat actuator 31 changes the variable overall length in accordance with the seat setting value. Thus, it is possible to change the seat height position, for example, by shifting the switch or the lever. Therefore, the rider can operate the seat operation device 16 in a short time to change the seat height position.

(12) The assist controller 62 increases the assist ratio when the seat setting value indicates the variable overall length is increased. The assist controller 62 decreases the assist ratio when the seat setting value indicates the variable overall length is decreased. Thus, it is possible to increase the assist ratio when the seat 12 is to be raised. Accordingly, it can alleviate a load of a rider's foot. In addition, it is possible to decrease the assist ratio when the seat 12 is to be lowered. Accordingly, it can increase operability of the bicycle 1.

(13) The bicycle control system 200 comprises the bicycle control device 100, the adjustable seatpost 11 having a variable overall length, and the assist actuator 30. Thus, it is possible to change the driving force based on the variable overall length of the adjustable seatpost 11. The variable overall length is related to a rider's posture on the bicycle 1 and a rider's pedaling load to move the bicycle 1 forward. Accordingly, it can alleviate a load of a rider's foot or increase operability of the bicycle 1.

Second Embodiment

A bicycle control system 202 including a bicycle control device 102 in accordance with a second embodiment will be described below referring to FIG. 7. The bicycle control device 102 has the same structure and/or configuration as those of the bicycle control device 100 except for the seat controller 58, the assist controller 62, and a bicycle tilt sensor 68. The bicycle control system 202 has the same structure and/or configuration as those of the bicycle control system 200 except for the bicycle control device 100. Thus, elements having substantially the same function as those in the first embodiment will be numbered the same here, and will not be described and/or illustrated again in detail here for the sake of brevity.

Figure 7:
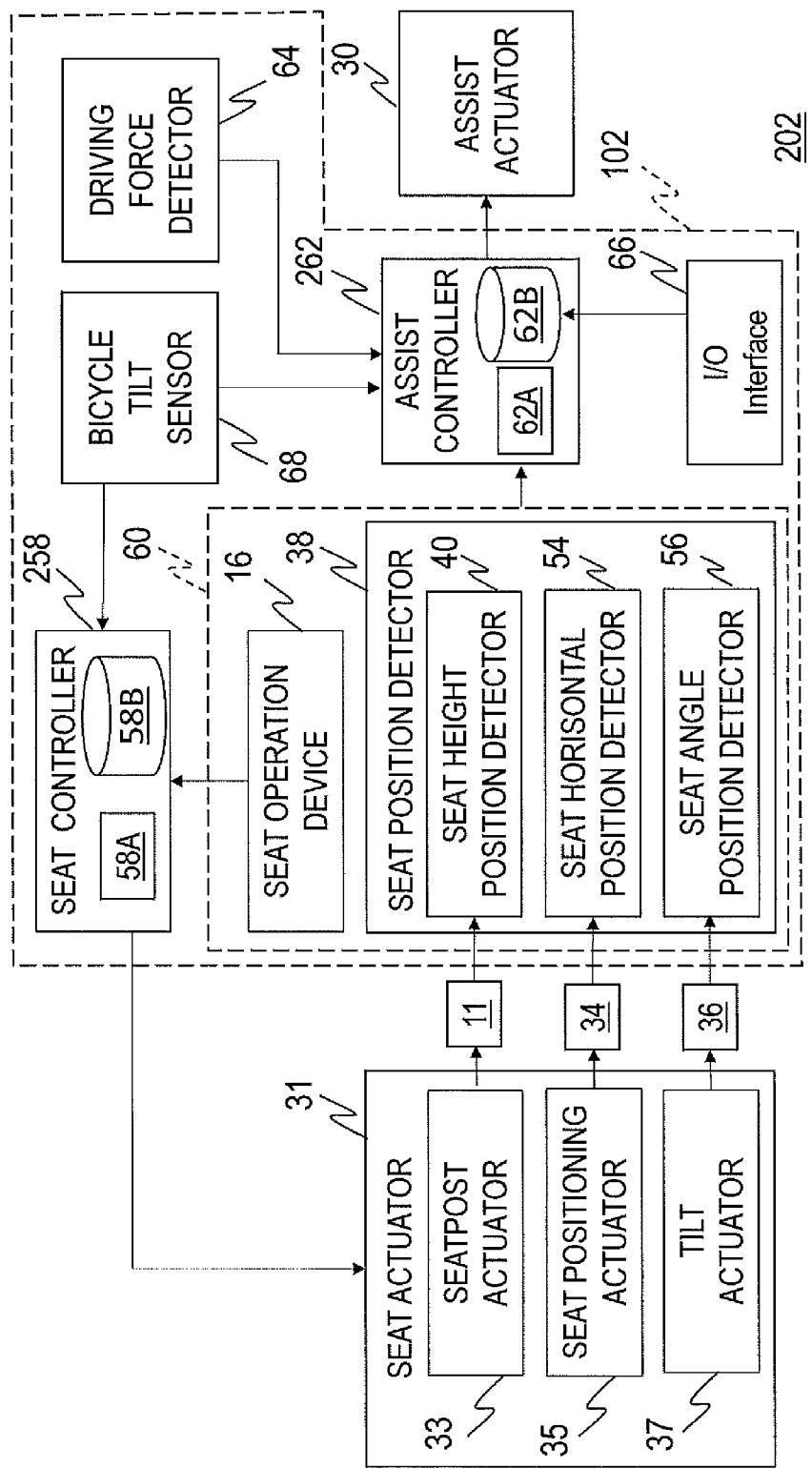
FIG. 7 is a block diagram of a bicycle control system in accordance with a second embodiment.

As seen in FIG. 7, the bicycle control device 102 further comprises a bicycle tilt sensor 68 and a seat controller 258. The bicycle tilt sensor 68 is configured to detect a tilt angle of a slope on which the bicycle 1 is. Typically, the bicycle tilt sensor 68 is an accelerometer to detect a direction of gravity. The bicycle tilt sensor 68 is preferably attached to the frame 2 or in a housing of the drive unit 20.

The seat controller 258 is configured to control the seat actuator 31 to change the seat position based on the tilt angle of the slope. Basically, the seat controller 258 can control the seat actuator 31 to set a seat position where a rider can easily increase the pedaling force when a road of the bicycle 1 inclines upward. The seat controller 258 can control the seat actuator 31 to set a seat position where a rider can easily operate the bicycle 1 when the road on the bicycle declines.

Figure 8:
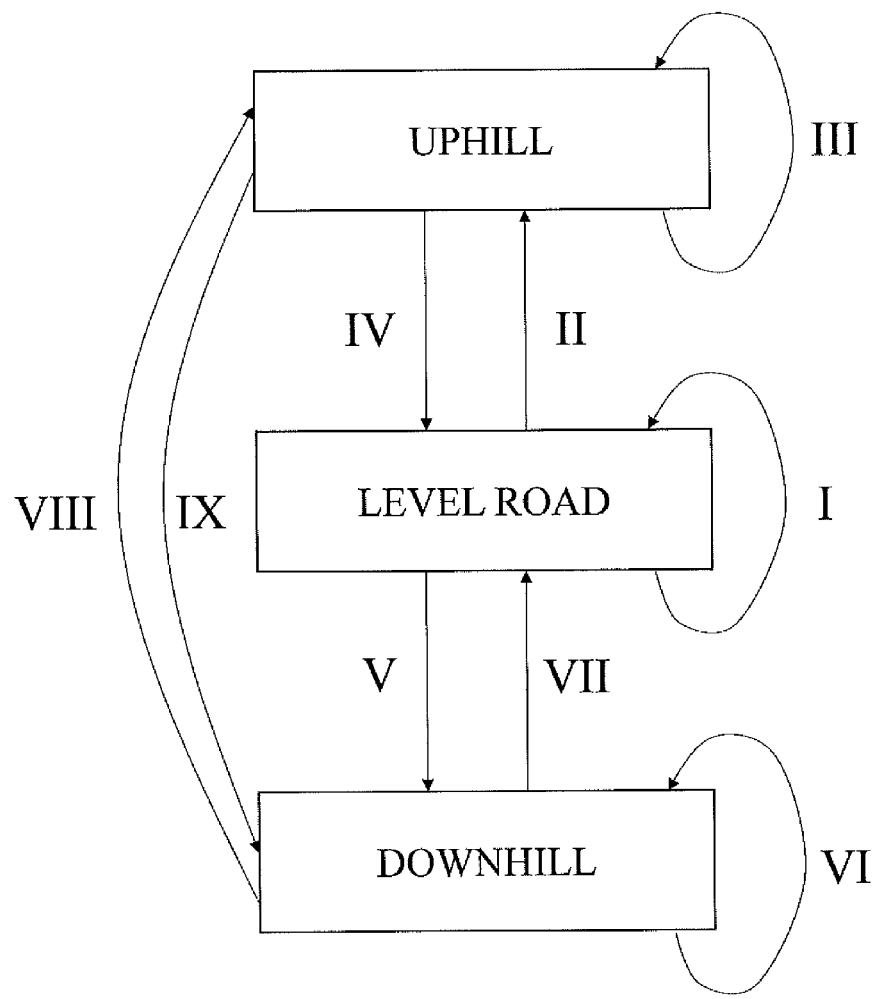
FIG. 8 is a state transition diagram of a bicycle control device in accordance with the second embodiment.

Details of the functionality of the seat controller 258 is described hereinafter by referring to FIGS. 8 and 9. As shown in FIG. 8, the seat controller 258 can determine one road state out of three states, namely, a level road state, an uphill state, and a downhill state. However, this is merely an example, and a total number of the road states is not limited in the embodiment of the present application. For example, the seat controller 258 can determine one road state out of five states, namely, a level road state, an uphill state, a steep uphill state, a downhill state, a steep downhill state.

The seat controller 258 can determine a current road state out of the three states based on the tilt angle θ of the slope where the bicycle 1 is. For example, the memory 49 may store two threshold values $\theta_1$ and $\theta_2$ ($\theta_1 < 0$ degree $< \theta_2$. When θ=0, the bicycle 1 is on a completely level road. When θ>0, the slope is inclined forward and upward. When $\theta<0$, the slope is inclined forward and downward.). When $\theta<\theta_1$, the seat controller 258 can determine the current road state is the downhill state. When $\theta_1 \leq \theta \leq \theta_2$, the seat controller 258 can determine the current road state is the level road state. When $\theta_2<\theta$, the seat controller 258 can determine the current road state is the uphill state.

The memory 49 can additionally store at least one of overall lengths of the adjustable seatpost 11, longitudinal lengths from the rearmost horizontal position RHP of the seat 12 in the front-rear direction, rotational angles of the seat 12 around the rotational axis A1 each of which corresponds to each of the road states. For example, the memory 49 can additionally store three overall lengths $SPL_1$, $SPL_2$, and $SPL_3$ ($SPL_1<SPL_2<SPL_3$) corresponding to the downhill state, the level road state, the uphill state, respectively. In the following description, $SPL_1$ may be referred to as a downward-setting overall length or a second length. $SPL_2$ may be referred to as a medium overall length. $SPL_3$ may be referred to as an upward-setting overall length or a first length. The seat controller 258 can control the seatpost actuator 33 to set the overall length of the adjustable seatpost 11 to one of $SPL_1$, $SPL_2$, and $SPL_3$ based on the current road state. The memory 49 can additionally store three longitudinal lengths $SLL_1$, $SLL_2$, and $SLL_3$ ($SLL_1<SLL_2<SLL_3$) corresponding to the downhill state, the level road state, the uphill state, respectively. The seat controller 258 can control the seat positioning actuator 35 to set the longitudinal length from the rearmost horizontal position RHP of the seat 12 in the front-rear direction to one of $SLL_1$, $SLL_2$, and $SLL_3$ based on the current road state. The memory 49 can additionally store three rotational angles $s\alpha_1$, $s\alpha_2$, and $s\alpha_3$ ($s\alpha_1<s\alpha_2<s\alpha_3$ in a case where the rotational angle $\alpha$ of the seat 12 increases when the seat 12 rotates around the rotational axis A1 clockwise viewed from the right of the bicycle 1) corresponding to the downhill state, the level road state, the uphill state, respectively. The seat controller 258 can control the tilt actuator 37 to set the rotational angles of the seat 12 around the rotational axis A1 to one of $s\alpha_1$, $s\alpha_2$, and $s\alpha_3$ based on the current road state.

The seat controller 258 can determine a current state in a predetermined time interval and determine a state transition based on the current state and an immediate preceding state which has been detected the predetermined time interval earlier. As shown in FIGS. 8 and 9, there are nine state transitions, namely, state transitions I to IX.

At the state transition I, the current road state remains the level road state, which means the overall length of the adjustable seatpost 11 is set to a medium overall length $SPL_2$, and/or the longitudinal length from the rearmost horizontal position RHP of the seat 12 in the front-rear direction is set to a medium longitudinal length $SLL_2$, and/or the rotational angle $\alpha$ of the seat 12 is set to a medium rotational angle $s\alpha_2$. The medium rotational angle $s\alpha_2$ is an angle to which the seat 12 is tilted to be oriented to the horizontal direction when the bicycle 1 is disposed on a horizontal plane. The medium overall length $SPL_2$, the medium longitudinal length $SLL_2$, the medium rotational angle $s\alpha_2$ are usual setting parameters for the seat 12. A seat height position, a seat horizontal position, and a seat angle position set with the usual setting parameters for the seat 12 can be referred to a medium seat height position, a medium seat horizontal position, and a medium seat angle position, respectively.

At the state transition II, the road state has changed from the level road state to the uphill state. In this state transition, the variable overall length of the adjustable seatpost 11 may change from $SPL_2$ to $SPL_3$, which means the seat controller 258 increases the variable overall length to be the first length $SPL_3$ when the slope is uphill. In other words, as shown in FIG. 9, the seat height position is raised. In the following description, a seat position after the change due to a state transition can be referred to a target position. In the above example, $SPL_3$ is a target position. In addition, the longitudinal length from the rearmost horizontal position RHP of the seat 12 in the front-rear direction may change from $SLL_2$ to $SLL_3$, which means the seat controller 258 moves the seat horizontal position forward. Further, rotational angle $\alpha$ of the seat 12 may change from $s\alpha_2$ to $s\alpha_3$, which means the seat controller 258 tilts the seat 12 forward and downward. Since the seat position is changed as described above, a rider can increase the pedaling force.

At the state transition III, the current road state remains the uphill state, which means the overall length of the adjustable seatpost 11 is set to an upward-setting overall length $SPL_3$, and/or the longitudinal length from the rearmost horizontal position RHP of the seat 12 in the front-rear direction is set to a forward-setting longitudinal length $SLL_3$, and/or the rotational angle $\alpha$ of the seat 12 is set to a forward tilting-setting rotational angle $s\alpha_3$.

At the state transition IV, the road state has changed from the uphill state to the level road state. In this state transition, the variable overall length of the adjustable seatpost 11 may change from $SPL_3$ to $SPL_2$, which means the seat controller 258 returns the variable overall length to be a medium overall length $SPL_2$ when the slope becomes gentle. In other words, as shown in FIG. 9, the seat height position is lowered to the medium seat height position. In addition, the longitudinal length from the rearmost horizontal position RHP of the seat 12 in the front-rear direction may change from $SLL_3$ to $SLL_2$, which means the seat controller 258 moves the seat horizontal position backward to the medium seat horizontal position. Further, rotational angle $\alpha$ of the seat 12 may change from $s\alpha_3$ to $s\alpha_2$, which means the seat controller 258 tilts the seat 12 backward and downward to return the seat angle position to the medium seat angle position. Since the seat position is changed as described above, operability of the bicycle 1 is increased.

At the state transition V, the road state has changed from the level road state to the downhill state. In this state transition, the variable overall length of the adjustable seatpost 11 may change from $SPL_2$ to $SPL_1$, which means the seat controller 258 decreases the variable overall length to be the second length $SPL_1$ when the slope is downhill. In other words, as shown in FIG. 9, the seat height position is lowered. In addition, the longitudinal length from the rearmost horizontal position RHP of the seat 12 in the front-rear direction may change from $SLL_2$ to $SLL_1$, which means the seat controller 258 moves the seat horizontal position backward. Further, rotational angle $\alpha$ of the seat 12 may change from $s\alpha_2$ to $s\alpha_1$, which means the seat controller 258 tilts the seat 12 backward and downward. Since the seat position is changed as described above, operability of the bicycle 1 is increased.

At the state transition VI, the current road state remains the downhill state, which means the overall length of the adjustable seatpost 11 is set to an downward-setting overall length $SPL_1$, and/or the longitudinal length from the rearmost horizontal position RHP of the seat 12 in the front-rear direction is set to a backward-setting longitudinal length $SLL_1$, and/or the rotational angle $\alpha$ of the seat 12 is set to a backward tilting-setting rotational angle $s\alpha_1$.

At the state transition VII, the road state has changed from the downhill state to the level road state. In this state transition, the variable overall length of the adjustable seatpost 11 may change from $SPL_1$ to $SPL_2$, which means the seat controller 258 returns the variable overall length to be a medium overall length $SPL_2$ when the slope becomes gentle. In other words, as shown in FIG. 9, the seat height position is raised to the medium seat height position. In addition, the longitudinal length from the rearmost horizontal position RHP of the seat 12 in the front-rear direction may change from $SLL_1$ to $SLL_2$, which means the seat controller 258 moves the seat horizontal position forward to the medium seat horizontal position. Further, rotational angle α of the seat 12 may change from $s\alpha_1$ to $s\alpha_2$, which means the seat controller 258 tilts the seat 12 forward and downward to return the seat angle position to the medium seat angle position. Since the seat position is changed as described above, operability of the bicycle 1 is increased.

At the state transition VIII, the road state has changed from the downhill state to the uphill state. In this state transition, the variable overall length of the adjustable seatpost 11 may change from $SPL_1$ to $SPL_3$, which means the seat controller 258 increases the variable overall length to be the first length $SPL_3$ when the slope is uphill. In other words, as shown in FIG. 9, the seat height position is raised. In addition, the longitudinal length from the rearmost horizontal position RHP of the seat 12 in the front-rear direction may change from $SLL_1$ to $SLL_3$, which means the seat controller 258 moves the seat horizontal position forward. Further, rotational angle α of the seat 12 may change from $s\alpha_1$ to $s\alpha_3$, which means the seat controller 258 tilts the seat 12 forward and downward. Since the seat position is changed as described above, a rider can increase the pedaling force.

At the state transition IX, the road state has changed from the uphill state to the downhill state. In this state transition, the variable overall length of the adjustable seatpost 11 may change from $SPL_3$ to $SPL_1$, which means the seat controller 258 decreases the variable overall length to be the second length $SPL_1$ when the slope is downhill. In other words, as shown in FIG. 9, the seat height position is lowered. In addition, the longitudinal length from the rearmost horizontal position RHP of the seat 12 in the front-rear direction may change from $SLL_3$ to $SLL_1$, which means the seat controller 258 moves the seat horizontal position backward. Further, rotational angle α of the seat 12 may change from $s\alpha_3$ to $s\alpha_1$, which means the seat controller 258 tilts the seat 12 backward and downward. Since the seat position is changed as described above, operability of the bicycle 1 is increased.

In this embodiment, the assist controller 262 sets the assist ratio in accordance with the following rule in addition to (Rule 1), (Rule 2), and (Rule 3) in the first embodiment.

(Rule 4) The assist controller 262 increases the assist ratio when the road of the bicycle 1 inclines upward. The assist controller 262 decreases the assist ratio when the road on the bicycle declines.

The memory 49 can additionally store assist ratios each of which corresponds to each of the level road state, the uphill state, and the downhill state. For example, the memory 49 can additionally store three assist ratios $SR_1$, $SR_2$, and $SR_3$ ($SR_1 < SR_2 < SR_3$) corresponding to the downhill state, the level road state, the uphill state, respectively. The assist controller 262 can control the assist actuator 30 to set the assist ratio to one of $SR_1$, $SR_2$, and $SR_3$ based on the current road state.

The assist controller 262 can determine a current state in a predetermined time interval and determine a state transition out of the nine state transitions shown in FIG. 9 based on the current state and an immediate preceding state which has been detected the predetermined time interval earlier.

At the state transition I, the current road state remains the level road state, which means the assist ratio is set to a medium assist ratio $SR_2$. The medium assist ratio $SR_2$ is a usual setting parameter for the assist actuator 30.

At the state transition II, the road state has changed from the level road state to the uphill state. In this state transition, the assist ratio may change from $SR_2$ to $SR_3$, which means the assist controller 262 increases the assist ratio to $SR_3$ when the slope is uphill. Since the assist ratio is increased, a load of a rider's foot can be alleviated.

At the state transition III, the current road state remains the uphill state, which means the assist ratio is set to a high-level assist ratio $SR_3$.

At the state transition IV, the road state has changed from the uphill state to the level road state. In this state transition, the assist ratio may change from $SR_3$ to $SR_2$, which means the assist controller 262 returns the assist ratio to the medium assist ratio $SR_2$ when the slope becomes gentle. Since the assist ratio is decreased as described above, a rider can easily push the pedal 28, thereby operability of the bicycle 1 is increased.

At the state transition V, the road state has changed from the level road state to the downhill state. In this state transition, the assist ratio may change from $SR_2$ to $SR_1$, which means the assist controller 262 decreases the assist ratio to $SR_1$ when the slope is downhill. Since the assist ratio is decreased, a rider can easily push the pedal 28, thereby operability of the bicycle 1 is increased.

At the state transition VI, the current road state remains the downhill state, which means the assist ratio is set to an low-level assist ratio $SR_1$.

At the state transition VII, the road state has changed from the downhill state to the level road state. In this state transition, the assist ratio may change from $SR_1$ to $SR_2$, which means the assist controller 262 returns the assist ratio to the medium assist ratio $SR_2$ when the slope becomes gentle. Since the assist ratio is increased as described above, a load of a rider's foot can be alleviated.

At the state transition VIII, the road state has changed from the downhill state to the uphill state. In this state transition, the assist ratio may change from $SR_1$ to $SR_3$, which means the assist controller 262 increases the assist ratio when the slope is uphill. Since the assist ratio is increased, a load of a rider's foot can be alleviated.

At the state transition IX, the road state has changed from the uphill state to the downhill state. In this state transition, the assist ratio may change from $SR_3$ to $SR_1$, which means the assist controller 262 decreases the assist ratio when the slope is downhill. Since the assist ratio is decreased, a rider can easily push the pedal 28, thereby operability of the bicycle 1 is increased.

In this embodiment, the threshold values (e.g. $\theta_1$ and $\theta_2$) for determining the road state, seatpost parameters (e.g. overall lengths $SPL_1$, $SPL_2$, and $SPL_3$ of the adjustable seatpost 11), seat horizontal position adjusting parameters (e.g. longitudinal lengths $SLL_1$, $SLL_2$, and $SLL_3$ from the rearmost horizontal position RHP of the seat 12 in the front-rear direction), seat angle position adjusting parameters (e.g. rotational angles $s\alpha_1$, $s\alpha_2$, and $s\alpha_3$ of the seat 12 around the rotational axis A1), assist ratios $SR_1$, $SR_2$, and $SR_3$ which correspond to road states can be set or rewritten via the I/O interface 66 with a cycle computer, a personal computer or a mobile terminal by an operator (e.g. a bicycle dealer or a rider). In the second embodiment, at least one of the rotation mechanism 36 and the seat adjusting mechanism 34 may be omitted, or two of the seatpost adjusting mechanism 32, the rotation mechanism 36, and the seat adjusting mechanism 34 may be omitted as described in the first embodiment.

With the bicycle control device 102 and the bicycle control system 202, it is possible to obtain substantially the same effects as those of the bicycle control device 100 and the bicycle control system 200 of the first embodiment, respectively.

Furthermore, the bicycle control device 102 has following additional features.

(1) The bicycle control device 102 further comprises the bicycle tilt sensor 68 and the seat controller 258. The bicycle tilt sensor 68 is configured to detect a tilt angle of a slope on which the bicycle 1 is. The seat controller 258 is configured to control the seat actuator 31 to change the seat position based on the tilt angle. Thus, it is possible to change the seat position based on the tilt angle of the slope on which the bicycle 1 is. When a rider goes up a hill with the bicycle 1, a rider usually desires to change the seat position to facilitate an increase of the pedaling force. When a rider goes down a hill with the bicycle 1, a rider usually desires to change the seat position differently to increase operability of the bicycle 1. Accordingly, it is possible to change the seat position automatically in accordance with a rider's usual desire to increase convenience of the bicycle 1.

(2) The seat height position corresponds to a variable overall length of the adjustable seatpost 11. The seat controller 258 increases the variable overall length to be the first length $SPL_3$ when the slope is uphill and decreases the variable overall length to be the second length $SPL_1$ when the slope is downhill. Thus, it is possible to change the overall length of the adjustable seatpost 11 based on the tilt angle of the slope on which the bicycle 1 is. When a rider goes up a hill with the bicycle 1, a rider usually desires to raise the seat 12 to facilitate an increase of the pedaling force. When a rider goes down a hill with the bicycle 1, a rider usually desires to lower the seat 12 to increase operability of the bicycle 1. Accordingly, it is possible to change the overall length of the adjustable seatpost 11 automatically in accordance with a rider's usual desire to increase convenience of the bicycle 1.

Third Embodiment

A bicycle control system 204 including a bicycle control device 104 in accordance with a third embodiment will be described below referring to FIG. 10. The bicycle control device 104 has the same structure and/or configuration as those of the bicycle control device 102 except for the assist controller 262. The bicycle control system 204 has the same structure and/or configuration as those of the bicycle control system 202 except for the bicycle control device 102. Thus, elements having substantially the same function as those in the second embodiment will be numbered the same here, and will not be described and/or illustrated again in detail here for the sake of brevity.

Figure 10:
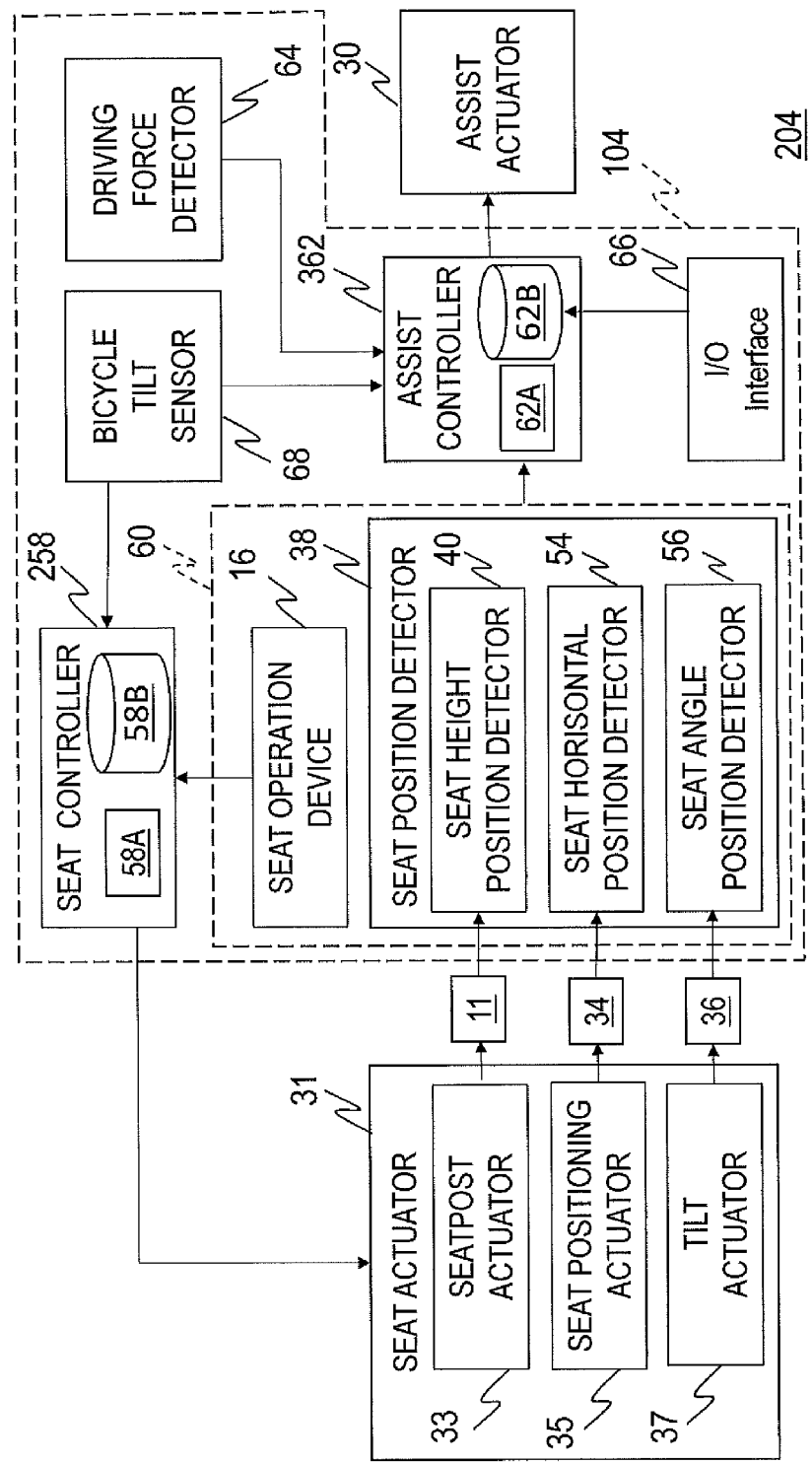
FIG. 10 is a block diagram of a bicycle control system in accordance with a third embodiment.

As shown in FIG. 10, the bicycle control device 104 comprises a assist controller 362. In this embodiment, the assist controller 362 sets the assist ratio in accordance with at least one of the following rules instead of (Rule 1) to (Rule 4) described in the second embodiment.

(Rule 5) After the road state is changed such that a road of the bicycle 1 inclines upward, the assist controller 362 temporarily increases the assist ratio to a first assist ratio until the seat position is changed to a target position determined based on the state transition. The assist controller 362 decreases the assist ratio to be a third assist ratio smaller than the first assist ratio after the seat position reaches the target position.

(Rule 6) After the road state is changed such that the road on the bicycle 1 declines, the assist controller 362 temporarily decreases the assist ratio to a second assist ratio until the seat position is changed to a target position determined based on the state transition. The assist controller 362 increases the assist ratio to be a fourth assist ratio larger than the second assist ratio after the seat position reaches the target position.

As shown in FIG. 11, the seat controller 258 controls the seat actuator 31 to change a seat position based on a road state, when a state transition occurs as described in the second embodiment. However, a time lag occurs from a time when the seat controller 258 determines the seat transition to a time when the seat position reaches the target position. Accordingly, the assist controller 362 temporarily changes the assist ratio in the time lag in order to alleviate a load of a rider's foot or to increase the operability of the bicycle 1.

Figure 12:
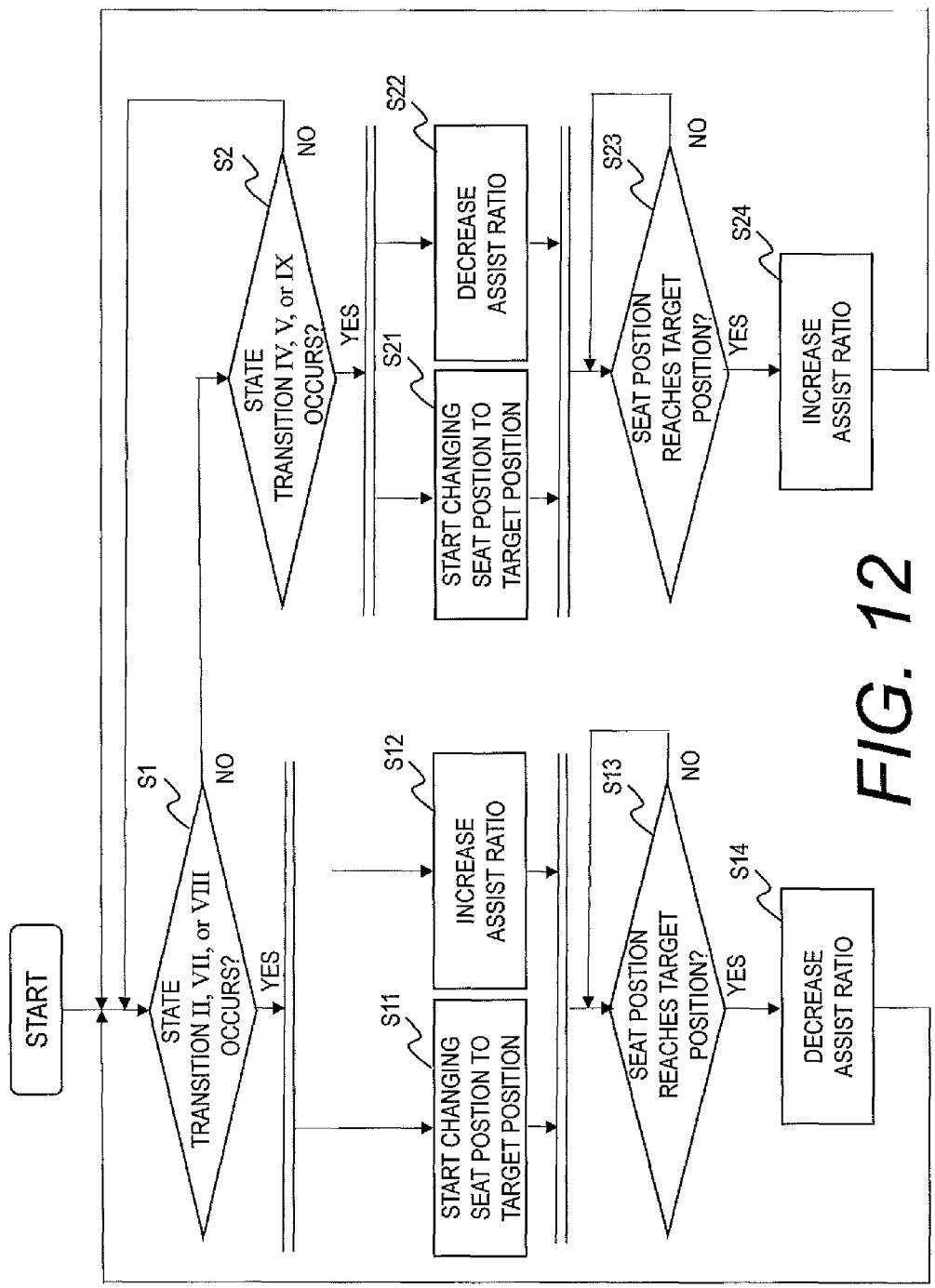
FIG. 12 is a flowchart showing processes executed by the assist controller and the seat controller in accordance with the third embodiment.

FIG. 12 shows a detail processes executed by the assist controller 362. In step S1, the assist controller 362 and the seat controller 258 determines whether the state transition II, VII, or VIII occurs in accordance with a method described in the second embodiment. When it is not determined that the state transition II, VII, or VIII occurs (No in the step S1), in step S2, the assist controller 362 and the seat controller 258 determines whether the state transition IV, V, or IX occurs in accordance with a method described in the second embodiment. When it is not determined that the state transition IV, V, or IX occurs (No in the step S2), the process returns to the step S1.

When it is determined the state transition II, VII, or VIII occurs (Yes in the step S1), in step S11, the seat controller 258 controls the seat actuator 31 to start changing the seat position to the target position based on the occurred state transition in accordance with a method described in the second embodiment. For example, in the state transition II, the seatpost actuator 33 starts changing the variable overall length of the adjustable seatpost 11 from $SPL_2$ to $SPL_3$. After this change, the seat 12 may be raised. Alternatively or additionally, the seat 12 may be moved forward. Further alternatively or additionally, the seat 12 is rotated to be tilted forward and downward. However, it takes a time lag for the seat position to reach the target position.

In step S12, substantially at the same time as step S11, the assist controller 362 controls the assist actuator 30 to increase the assist ratio to be a first assist ratio $TR_1$. The assist controller 362 may increase the assist ratio by the same amount as the assist controller 262 does. That is, for example, in the state transition II, $TR_1$ may be equal to $SR_3$. However, the assist controller 362 may increase the assist ratio by a different amount. That is, for example, in the state transition II, $TR_1$ may be different from $SR_3$. Although it takes a time lag for the seat position to reach the target position, the assist controller 362 can immediately increase the assist ratio. Accordingly, in a case where the variable overall length of the adjustable seatpost 11 is changed from $SPL_2$ to $SPL_3$ in the state transition II, the assist controller 362 temporarily increases the assist ratio to be the first assist ratio $TR_1$ when the slope is uphill until the variable overall length of the seatpost 11 reaches the first length $SPL_3$. In FIG. 12, the step S11 and the step S12 are executed in parallel, but they may be executed serially.

In step S13, the assist controller 362 receives a current seat position from the seat position detector 38 to determine whether the seat position reaches the target position. When it is not determined that the seat position reaches the target position (No in the step S13), the step S13 is repeatedly executed. When it is determined that the seat position reaches the target position (Yes in the step S13), in step S14, the assist controller 362 decreases the assist ratio to be a third assist ratio $TR_3$ smaller than the first assist ratio $TR_1$ after the seat position reaches the target position. $TR_3$ may be equal to one of $SR_1$ to $SR_3$, but $TR_3$ may be an independent value of $SR_1$ to $SR_3$. For example, in the state transition II, the assist controller 362 decreases the assist ratio to be the third assist ratio $TR_3$ smaller than the first assist ratio $TR_1$ after the overall length of the seatpost 11 reaches the first length $SPL_3$. After the step S14, the process returns to the step S1.

When it is determined the state transition IV, V, or IX occurs (Yes in the step S2), in step S21, the seat controller 258 controls the seat actuator 31 to start changing the seat position to the target position based on the occurred state transition in accordance with a method described in the second embodiment. For example, in the state transition V, the seatpost actuator 33 starts changing the variable overall length of the adjustable seatpost 11 from $SPL_2$ to $SPL_1$. After this change, the seat 12 may be lowered. Alternatively or additionally, the seat 12 may be moved backward. Further alternatively or additionally, the seat 12 is rotated to be tilted backward and downward. However, it takes a time lag for the seat position to reach the target position.

In step S22, substantially at the same time as step S21, the assist controller 362 controls the assist actuator 30 to decrease the assist ratio to be a second assist ratio $TR_2$. The assist controller 362 may decrease the assist ratio by the same amount as the assist controller 262 does. That is, for example, in the state transition V, $TR_2$ may be equal to $SR_1$. However, the assist controller 362 may decrease the assist ratio by a different amount. That is, for example, in the state transition V, $TR_2$ may be different from $SR_1$. Although it takes a time lag for the seat position to reach the target position, the assist controller 362 can immediately decrease the assist ratio. Accordingly, in a case where the variable overall length of the adjustable seatpost 11 is changed from $SPL_2$ to $SPL_1$ in the state transition V, the assist controller 362 temporarily decreases the assist ratio to be the second assist ratio $TR_2$ when the slope is downhill until the variable overall length of the seatpost 11 reaches the second length $SPL_1$. In FIG. 12, the step S21 and the step S22 are executed in parallel, but they may be executed serially.

In step S23, the assist controller 362 receives a current seat position from the seat position detector 38 to determine whether the seat position reaches the target position. When it is not determined that the seat position reaches the target position (No in the step S23), the step S23 is repeatedly executed. When it is determined that the seat position reaches the target position (Yes in the step S23), in step S24, the assist controller 362 increases the assist ratio to be a fourth assist ratio $TR_4$ larger than the second assist ratio $TR_2$ after the seat position reaches the target position. $TR_4$ may be equal to one of $SR_1$ to $SR_3$, but $TR_4$ may be an independent value of $SR_1$ to $SR_3$. For example, in the state transition V, the assist controller 362 increases the assist ratio to be the fourth assist ratio $TR_4$ larger than the second assist ratio $TR_2$ after the overall length of the seatpost 11 reaches the second length $SPL_1$. After the step S24, the process returns to the step S1.

In this embodiment, the assist ratios $TR_1$ to $TR_4$ which correspond to state transition can be set or rewritten via the I/O interface 66 with a cycle computer, a personal computer or a mobile terminal by an operator (e.g. a bicycle dealer or a rider). In the second embodiment, at least one of the rotation mechanism 36 and the seat adjusting mechanism 34 may be omitted, or two of the seatpost adjusting mechanism 32, the rotation mechanism 36, and the seat adjusting mechanism 34 may be omitted as described in the first embodiment.

With the bicycle control device 104 and the bicycle control system 204, it is possible to obtain substantially the same effects as those of the bicycle control device 102 and the bicycle control system 202 of the second embodiment, respectively.

In the third embodiment, the seatpost 11 may be changed in accordance with a rider's operation of the seat operation device 16. In this case, steps S11 and S21 in FIG. 12 may be omitted. In this case, the seat controller 258 controls the seat actuator 31 to start changing the seat position to the target position in accordance with the rider's operation. In Step S13 and S23, the assist controller 362 receives a current seat position from the seat position detector 38 to determine whether the seat position reaches the target position, i.e., the assist controller 362 determines whether the rider inputs an operation to change the seat position to the target position.

Furthermore, the bicycle control device 104 has following additional features.

(1) The bicycle control device 104 further comprises the driving force detector 64 configured to detect the driving force. The assist controller 362 is configured to control the assist actuator 30 to generate an assisting force based on the driving force, and to change an assist ratio of the assisting force to the driving force based on the seat information. The assist controller 362 temporarily increases the assist ratio to be the first assist ratio $TR_1$ when the slope is uphill until the variable overall length of the seatpost 11 reaches the first length $SPL_3$. The assist controller 362 temporarily decreases the assist ratio to be the second assist ratio $TR_2$ when the slope is downhill until the variable overall length of the seatpost 11 reaches the second length $SPL_1$. It takes time for the seatpost 11 to have a target length (the first length $SPL_3$ or the second length $SPL_1$) based on the tilt angle of the slope, but it is possible to immediate change the assist ratio based on the tilt angle of the slope until the seatpost 11 has the target length to increase pedaling convenience of the bicycle 1.

(2) The assist controller 362 decreases the assist ratio to be the third assist ratio $TR_3$ smaller than the first assist ratio $TR_1$ after the overall length of the seatpost 11 reaches the first length $SPL_3$. The assist controller 362 increases the assist ratio to be the fourth assist ratio $TR_4$ larger than the second assist ratio $TR_2$ after the overall length of the seatpost 11 has the second length $SPL_1$. Thus, it is possible to immediate return the assist ratio toward an original value after the seatpost 11 has the target length. Therefore, pedaling convenience of the bicycle 1 is further increased.

Fourth Embodiment

Figure 13:
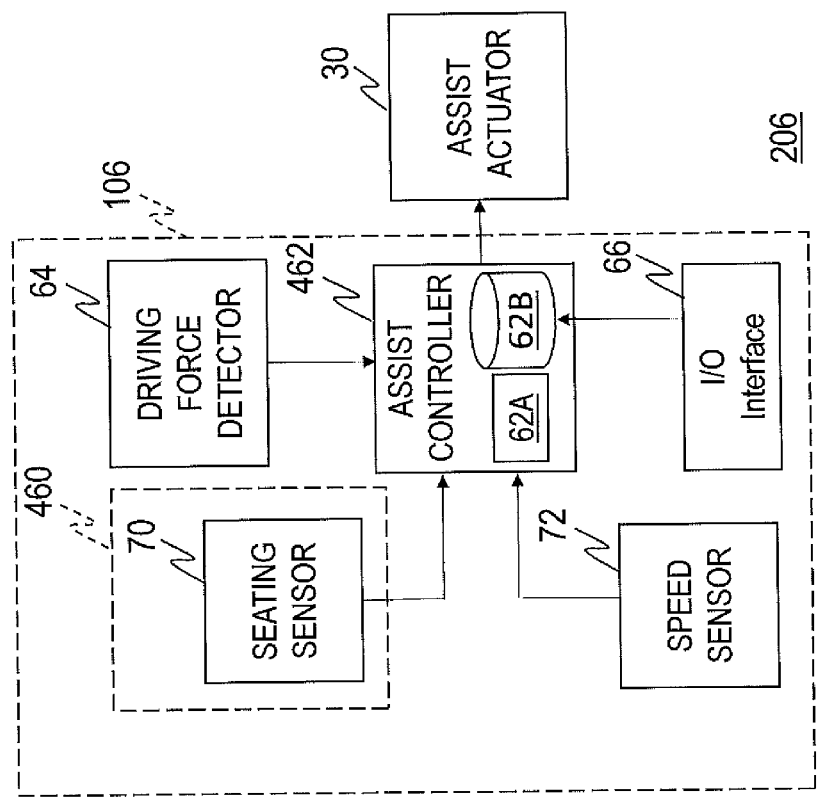
FIG. 13 is a block diagram of a bicycle control system in accordance with a fourth embodiment.

A bicycle control system 206 including a bicycle control device 106 in accordance with a fourth embodiment will be described below referring to FIG. 13. The bicycle control system 206 comprises the bicycle control device 106 and the assist actuator 30. The bicycle control device 106 comprises a seat information generator 460, an assist controller 462, the driving force detector 64, and the I/O interface 66. The bicycle control device 106 further comprises a speed sensor 72. The assist actuator 30, the driving force detector 64, and the I/O interface 66 have substantially the same function as those in the first to third embodiments, and will not be described and/or illustrated again in detail here for the sake of brevity. The assist controller 462 can have the same structure and/or functionality as those of the assist controller 62, 262, or 362 except for the following description in this embodiment.

In this embodiment, the seat information generator 460 includes a seating sensor 70 to detect a seat load applied to a seat 12 or a seatpost 11. Thus, the seat information includes the seat load. The seat information generator 460 may further includes the seat operation device 16 and/or the seat position detector 38 according to at the first to the third embodiments.

The seating sensor 70 can include a membrane switch disposed in the seat 12 to detect whether or not the seat load applied to the seat 12 is under a predetermined level. The membrane switch typically includes a first flexible film substrate, a second flexible film substrate, and an insulating spacer. On the first flexible film substrate, a first conductive pattern including a first electrode is provided. On the second first flexible film substrate, a second conductive pattern including a second electrode is provided. The second flexible film substrate is disposed apart from the first flexible film substrate in the first direction. The insulating spacer is disposed between the first flexible film substrate and the second flexible film substrate in the first direction. The first electrode overlaps with the second electrode viewed in the first direction. The insulating spacer has an opening overlapping with the first and second electrodes in the first direction. When a rider does not sit on the seat 12, the first electrode does not contact with the second electrode, thereby the seating sensor 70 detects the seat load is under a predetermined level. When a rider sits on the seat 12, at least one of the first and second flexible film substrates is curved in the first direction, thereby the first electrode contacts with the second electrode. In this case, the seating sensor 70 detects the seat load applied to the seat 12 is equal to or over the predetermined level.

Alternatively or additionally, the seating sensor 70 can include a piezoelectric element or an electric-resistance strain gage to detect a displacement (an elastic deformation) of the seat 12 or the seatpost 11 to detect the seat load applied to the seat 12 or the seatpost 11. For example, the seating sensor 70 may include an electric-resistance strain gage provided on a seat rail of the seat 12 to output an electric signal based on an elastic deformation of the seat rail (the displacement of the seat 12). The seating sensor 70 may include a load cell provided at a bottom part of the seat 12 or the seatpost 11 to detect the seat load applied to the seat 12 or the seatpost 11 directly. The seating sensor 70 may include a tact switch arranged below a sitting surface of a seat 12.

The speed sensor 72 is configured to detect a speed of the bicycle 1. The speed sensor 72 can include a rotation speed sensor to detect a rotation speed of at least one of the front wheel 4 and the rear wheel 6. The rotation speed sensor may include a magnet attached to the front wheel 4 and a magnetic sensor attached to a front fork of the frame 2 to detect a physical proximity to the magnet. Alternatively or additionally, the rotation speed sensor may include a magnet attached to the rear wheel 6 and a magnetic sensor attached to a seat stay or a chain stay of the frame 2 to detect a physical proximity to the magnet. Each of the rotation speed sensor described above outputs a pulse signal when the magnet comes in proximity to the magnetic sensor and the rotation speed can be calculated from a time interval between two consecutive pulses. Alternatively, the speed sensor may include a Global Positioning System (GPS) sensor to detect the speed of the bicycle 1 by detecting the traveling distance per unit time.

The assist controller 462 increases the assist ratio when the bicycle speed detected by the speed sensor 72 is over a predetermined speed and the seat load detected by the seating sensor 70 is under the predetermined level. The predetermined speed is preferably greater than 0 km/h. Accordingly, determining whether the bicycle speed is over the predetermined speed eliminates such cases that a rider does not pedal the bicycle 1. The predetermined level of the saddle load is preferably set to eliminate noises when a rider does not sit on the seat 12. Therefore, the assist controller 462 increases the assist ratio in a situation when a rider pedals the bicycle 1 without sitting on the seat 12, for example, when the rider goes up a hill with the bicycle 1. After the assist ratio is increased, when the bicycle speed becomes equal to or under the predetermined speed, or the seat load is equal to or over the predetermined level, the assist controller 462 returns the assist ratio to an original value.

In a case where the seat information generator 460 may further includes the seat operation device 16 and/or the seat position detector 38 according to at the first to the third embodiments, the assist controller 462 may increase the assist ratio in conditions described in the first to the third embodiments even when the rider sits on the seat 12 and may additionally increase the assist ratio when the bicycle speed detected by the speed sensor 72 is over the predetermined speed and the seat load detected by the seating sensor 70 is under the predetermined level. For example, when the bicycle speed detected by the speed sensor 72 is equal to or under the predetermined speed or the seat load detected by the seating sensor 70 is equal to or over the predetermined level, after an overall length of the adjustable seatpost 11 is increased, the assist controller may increase the assist ratio by a first additional ratio ARD1 in accordance with (Rule 1). When the bicycle speed detected by the speed sensor 72 is over the predetermined speed and the seat load detected by the seating sensor 70 is under the predetermined level, after an overall length of the adjustable seatpost 11 is increased, the assist controller may increase the assist ratio by a first additional ratio ARD1 plus a second additional ratio ARD2. In another case, when the bicycle speed detected by the speed sensor 72 is equal to or under the predetermined speed, or the seat load detected by the seating sensor 70 is equal to or over the predetermined level, the assist controller 462 may decrease the assist ratio, then after an overall length of the adjustable seatpost 11 is decreased, the assist controller 462 may further decrease the assist ratio.

With the bicycle control device 106 and the bicycle control system 206, it is possible to obtain substantially the same effects as those of the bicycle control device 100 and the bicycle control system 200 of the first embodiment, the bicycle control device 102 and the bicycle control system 202 of the second embodiment, and the bicycle control device 104 and the bicycle control system 204 of the third embodiment, respectively.

Furthermore, the bicycle control device 106 further comprises the speed sensor 72 configured to detect a speed of the bicycle 1. The seat information generator 460 includes the seating sensor 70 to detect a seat load applied to the seat 12 or the seatpost 11. The seat information includes the seat load. The assist controller 462 increases the assist ratio when the bicycle speed detected by the speed sensor 72 is over the predetermined speed and the seat load detected by the seating sensor 70 is under the predetermined level. Thus, it is possible to increase the assist ratio when a rider pedals the bicycle 1 without sitting on the seat 12, for example, when the rider goes up a hill with the bicycle 1. Accordingly, it can alleviate a load of a rider's foot.

Figure 14:
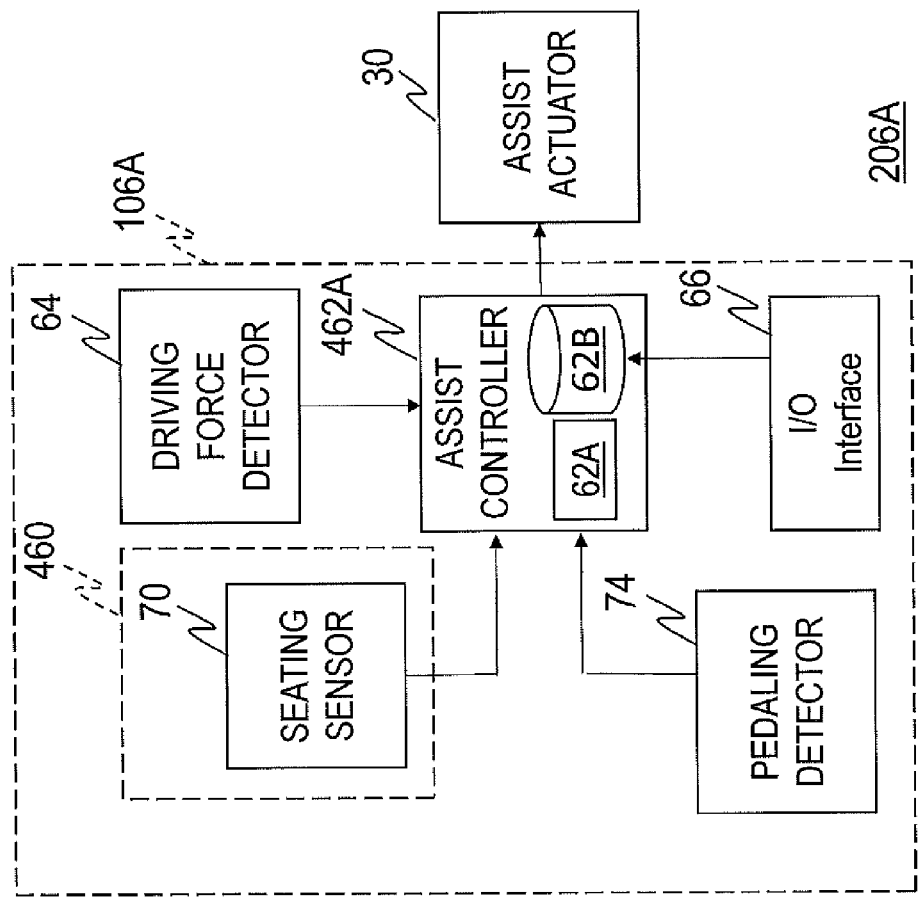
FIG. 14 is a block diagram of an alternative bicycle control system in accordance with the fourth embodiment.

In this embodiment, the bicycle control system 206 may be an alternative bicycle control system. An alternative bicycle control system 206A including an alternative bicycle control device 106A in accordance with the fourth embodiment will be described below referring to FIG. 14. The bicycle control device 106A comprises an assist controller 462A instead of the assist controller 462. The bicycle control device 106A further comprises a pedaling detector 74 instead of the speed sensor 72.

The pedaling detector 74 is configured to detect a pedaling of a rider. The pedaling detector 74 may include a cadence sensor to detect a rotation of the crankshaft 26. The cadence sensor may include a magnet attached to the crankshaft 26 and a magnetic sensor attached to a casing attached to the frame 2 to detect a physical proximity to the magnet. The casing usually houses the assist actuator 30. The cadence sensor outputs a pulse signal when the magnet comes in proximity to the magnetic sensor and the rotation speed can be calculated from a time interval between two consecutive pulses. Alternatively, the pedaling detector 74 may include a rotational potentiometer attached to a rotation axis of the pedal 28 to detect a rotation of the pedal 28. That is, the pedaling detector 74 may be configured to detect a rotation of the crankshaft 26 or the pedal 28. When each of the cadence sensor and the rotational potentiometer detects a rotational speed greater than a predetermined rotational speed, the pedaling detector 74 detects the pedaling of a rider. The predetermined rotational speed is preferably set to eliminate noises when a rider does not pedal the bicycle 1. Further, the pedaling detector 74 may be the driving force detector 64 to detect the pedaling force of a rider. When the driving force detector 64 detects the pedaling force greater than a predetermined torque, the driving force detector 64 detects the pedaling of a rider. The predetermined torque is preferably set to eliminate noises when a rider does not pedal the bicycle 1.

The assist controller 462A increases the assist ratio when the pedaling detector 74 detects the pedaling of the rider and the seat load detected by the seating sensor 70 is under the predetermined level. The predetermined level of the saddle load is preferably set to eliminate noises when a rider does not sit on the seat 12. Therefore, the assist controller 462A increases the assist ratio in a situation when a rider pedals the bicycle 1 without sitting on the seat 12, for example, when the rider goes up a hill with the bicycle 1. After the assist ratio is increased, when pedaling detector 74 does not detect the pedaling of the rider, or the seat load is equal to or over the predetermined level, the assist controller 462A returns the assist ratio to an original value. The assist controller 462A may have the same functionality as described above in a case where the seat information generator 460 further includes the seat operation device 16 and/or the seat position detector 38 according to at the first to the third embodiments.

With the bicycle control device 106A and the bicycle control system 206A, it is possible to obtain similar effects to those of the bicycle control device 106 and the bicycle control system 206.

The bicycle control device 106A further comprises the pedaling detector 74 configured to detect a pedaling of a rider. The assist controller 462A increases the assist ratio when the pedaling detector 74 detects the pedaling of the rider and the seat load detected by the seating sensor 70 is under the predetermined level. Thus, it is possible to increase the assist ratio when a rider pedals the bicycle 1 without sitting on the seat 12, for example, when the rider goes up a hill with the bicycle 1. Accordingly, it can alleviate a load of a rider's foot.

Figure 15:
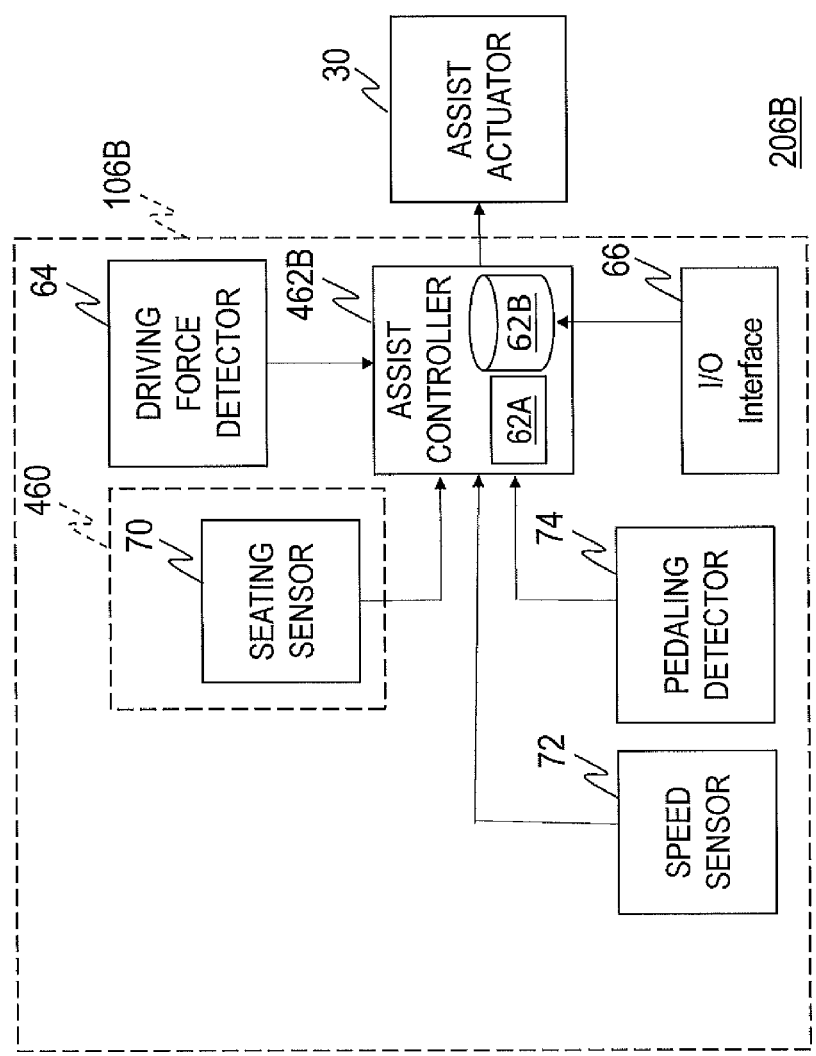
FIG. 15 is a block diagram of another alternative bicycle control system in accordance with the fourth embodiment.

In this embodiment, the bicycle control system 206 may be another alternative bicycle control system. Another alternative bicycle control system 206B including an alternative bicycle control device 106B in accordance with the fourth embodiment will be described below referring to FIG. 15. The bicycle control device 106B comprises an assist controller 462B instead of the assist controller 462 or 462A. The bicycle control device 106B further comprises the speed sensor 72 and the pedaling detector 74. The speed sensor 72 and the pedaling detector 74 have the same functionalities as shown above.

The assist controller 462B increases the assist ratio when the bicycle speed detected by the speed sensor 72 is over a predetermined speed, the pedaling detector 74 detects the pedaling of the rider, and the seat load detected by the seating sensor 70 is under the predetermined level. The predetermined speed, the predetermined level, the threshold values for detecting the pedaling of the rider are preferably set as described above. By using the seating sensor 70, the speed sensor 72, and the pedaling detector 74, the assist controller 462B does not increase the assist ratio when a rider goes down a hill without pedaling the bicycle 1 and without sitting on the seat 12 and when a rider pedals the bicycle 1 without the rear wheel 6 being contacted on the ground (when a parking stand of the bicycle 1 contacts with the ground).

With the bicycle control device 106B and the bicycle control system 206B, it is possible to obtain substantially the same effects as those of the bicycle control device 106 and the bicycle control system 206 and those of the bicycle control device 106A and the bicycle control system 206A.

Furthermore, the bicycle control device 106B does not increase the assist ratio when a rider goes down a hill without pedaling the bicycle 1 and without sitting on the seat 12 and when a rider pedals the bicycle 1 without the rear wheel 6 being contacted on the ground (when a parking stand of the bicycle 1 contacts with the ground). Thus, the bicycle control device 106B does not consume electric energy while the assisting force is not necessary. Accordingly, the bicycle control device 106B can save electric energy effectively.

In this embodiment, the predetermined speed, the predetermined level, the threshold values for detecting the pedaling of the rider can be set or rewritten via the I/O interface 66 with a cycle computer, a personal computer or a mobile terminal by an operator (e.g. a bicycle dealer or a rider).

It will be apparent to those skilled in the bicycle field from the present disclosure that the above embodiments can be modified within a scope of the present invention.

For example, in the above embodiments, the seat horizontal position is defined as a longitudinal length from the rearmost horizontal position RHP of the seat 12 in the front-rear direction which can be adjusted to with the seat adjusting mechanism 34. However, the seat horizontal position may be defined as a longitudinal length from the forefront horizontal position FHP (FIG. 1) of the seat 12 in the front-rear direction which can be adjusted to with the seat adjusting mechanism 34. Alternatively, the seat horizontal position may be defined as an one-dimensional coordinate with respect to a specific horizontal position of the seat 12. The specific horizontal position may be a middle horizontal position between the rearmost horizontal position RHP and the forefront horizontal position FHP in the front-rear direction. The parameters related to the seat horizontal position $LL_{min}$, $LL_1$, $LL_2$, ..., $LL_{i-1}$, $LL_i$, ..., $LL_{max}$, $SLL_1$, $SLL_2$, $SLL_3$, and $HP_i$ should be set in accordance with each of the above definition of the seat horizontal position.

In addition, in the above embodiments, the seat angle position is defined as the rotational angle α of the seat 12 which can increase when the seat 12 rotates around the rotational axis A1 clockwise viewed from the right of the bicycle 1. However, the rotational angle α may decrease when the seat 12 rotates around the rotational axis A1 clockwise viewed from the right of the bicycle 1. The parameters related to the seat angle position $\alpha_{min}$, $\alpha_1$, $\alpha_2$, ... $\alpha_{i-1}$, $\alpha_i$, ..., $\alpha_{n-1}$, $\alpha_{max}$, $s\alpha_1$, $s\alpha_2$, $s\alpha_3$, and $p\alpha_i$ should be set in accordance with each of the above definition of the seat angle position.

The term "configured" as used herein to describe a component, section or part of a device includes hardware and/or software that is constructed and/or programmed to carry out the desired function. The desired function can be carried out by hardware, software, or a combination of hardware and software.

In the present application, the term "attached" or "attaching", as used herein, can encompass configurations in which an element is directly attached to the other element by affixing the element directly to the other element; configurations in which the element is indirectly attached to the other element via the intermediate member(s); and configurations in which one element is integral with the other element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the tetrm "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle control device comprising:
   a seat information generator configured to generate seat information, the seat information generator including a seat position detector to detect a seat position corresponding to at least one of seat height position, seat angle position, and seat horizontal position; and
   an assist controller configured to control an assist actuator to assist a driving force of a bicycle based on the seat information including the seat position.

2. The bicycle control device according to claim 1, further comprising
   a driving force detector configured to detect the driving force, wherein
   the assist controller is configured to control the assist actuator to generate an assisting force based on the driving force and to change an assist ratio of the assisting force to the driving force based on the seat information.

3. The bicycle control device according to claim 2, further comprising
   a speed sensor configured to detect a speed of the bicycle, wherein
   the seat information generator includes a seating sensor to detect a seat load applied to a seat or a seatpost,
   the seat information includes the seat load, and
   the assist controller increases the assist ratio when the bicycle speed detected by the speed sensor is over a predetermined speed and the seat load detected by the seating sensor is under a predetermined level.

4. The bicycle control device according to claim 2, further comprising
   a pedaling detector configured to detect a pedaling of a rider, wherein
   the seat information generator includes a seating sensor to detect a seat load applied to a seat or a seatpost,
   the seat information includes the seat load, and
   the assist controller increases the assist ratio when the pedaling detector detects the pedaling of the rider and the seat load detected by the seating sensor is under a predetermined level.

5. The bicycle control device according to claim 1, wherein
   the seat height position corresponds to a variable overall length of an adjustable seatpost, and
   the assist controller increases the assist ratio when the variable overall length increases.

6. The bicycle control device according to claim 5, wherein
   the assist controller decreases the assist ratio when the variable overall length decreases.

7. The bicycle control device according to claim 1, wherein
   the seat height position corresponds to a variable overall length of an adjustable seatpost, and
   the assist controller decreases the assist ratio when the variable overall length decreases.

8. The bicycle control device according to claim 1, wherein
   the seat information generator includes a seat operation device configured to receive a seat adjustment operation input by a rider,
   the seat operation device is configured to generate a seat adjustment trigger in accordance with the seat adjustment operation to transmit the seat adjustment trigger to a seat controller, and
   the seat information includes the seat adjustment trigger.

9. The bicycle control device according to claim 8, wherein
the seat operation device transmits the seat adjustment trigger to the seat controller via wireless communication.

10. The bicycle control device according to claim 8, further comprising
the seat controller configured to control a seat actuator to change the seat position based on the seat adjustment trigger.

11. The bicycle control device according to claim 10, wherein
the seat actuator changes the seat position while the seat adjustment operation is input.

12. The bicycle control device according to claim 10, further comprising
the seat controller configured to control the seat actuator to change a variable overall length of an adjustable seatpost based on the seat adjustment trigger, wherein
the seat height position corresponds to the variable overall length.

13. The bicycle control device according to claim 12, wherein
the seat adjustment operation includes inputting a seat setting value related to the variable overall length,
the seat adjustment trigger includes information related to the seat setting value, and
the seat actuator changes the variable overall length in accordance with the seat setting value.

14. The bicycle control device according to claim 13, wherein
the assist controller increases the assist ratio when the seat setting value indicates the variable overall length is increased, and
the assist controller decreases the assist ratio when the seat setting value indicates the variable overall length is decreased.

15. The bicycle control device according to claim 1, further comprising:
a bicycle tilt sensor configured to detect a tilt angle of a slope on which a bicycle is; and
a seat controller configured to control a seat actuator to change the seat position based on the tilt angle.

16. The bicycle control device according to claim 15, wherein
the seat height position corresponds to a variable overall length of an adjustable seatpost, and
the seat controller increases the variable overall length to be a first length when the slope is uphill and decreases the variable overall length to be a second length when the slope is downhill.

17. The bicycle control device according to claim 16, further comprising
a driving force detector configured to detect the driving force, wherein
the assist controller is configured to control the assist actuator to generate an assisting force based on the driving force and to change an assist ratio of the assisting force to the driving force based on the seat information,
the assist controller temporarily increases the assist ratio to be a first assist ratio when the slope is uphill until the variable overall length of the seatpost reaches the first length, and
the assist controller temporarily decreases the assist ratio to be a second assist ratio when the slope is downhill until the variable overall length of the seatpost reaches the second length.

18. The bicycle control device according to claim 17, wherein
the assist controller decreases the assist ratio to be a third assist ratio smaller than the first assist ratio after the overall length of the seatpost reaches the first length, and
the assist controller increases the assist ratio to be a fourth assist ratio larger than the second assist ratio after the overall length of the seatpost has the second length.

19. A bicycle control system comprising:
the control device according to claim 1;
an adjustable seatpost having a variable overall length; and
the assist actuator.

20. A bicycle control device comprising:
a seat information generator configured to generate seat information, the seat information generator including a seat operation device configured to receive a seat adjustment operation input by a rider, the seat operation device being configured to generate a seat adjustment trigger in accordance with the seat adjustment operation to transmit the seat adjustment trigger to a seat controller; and
an assist controller configured to control an assist actuator to assist a driving force of a bicycle based on the seat information including the seat adjustment trigger.

21. A bicycle control device comprising:
a speed sensor configured to detect a speed of the bicycle;
a driving force detector configured to detect a driving force of a bicycle;
a seating sensor configured to detect a seat load applied to a seat or a seatpost; and
an assist controller configured to control an assist actuator to generate an assisting force based on the driving force such that the assist controller increases an assist ratio of the assisting force to the driving force based on a generated seat height position, seat angle position or seat horizontal position when the bicycle speed detected by the speed sensor is over a predetermined speed and the seat load detected by the seating sensor is under a predetermined level.

* * * * *